US006400819B1

(12) United States Patent
Nakano et al.

(10) Patent No.: US 6,400,819 B1
(45) Date of Patent: Jun. 4, 2002

(54) METHOD AND APPARATUS FOR EXECUTING COMMUNICATION IN REAL-TIME AND DATA STRUCTURE FOR REAL-TIME DATA COMMUNICATION

(75) Inventors: Takahiro Nakano, Yokohama; Masaaki Iwasaki, Tachikawa; Masahiko Nakahara; Tadashi Takeuchi, both of Yokohama, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/048,120

(22) Filed: Mar. 26, 1998

Related U.S. Application Data

(63) Continuation-in-part of application No. 08/824,338, filed on Mar. 26, 1997, now Pat. No. 5,944,778.

(30) Foreign Application Priority Data

Mar. 28, 1996 (JP) .............................. 8-073673
Mar. 27, 1997 (JP) .............................. 9-075018

(51) Int. Cl.⁷ .............................................. H04L 12/40
(52) U.S. Cl. ........................ 379/229; 370/412; 709/235
(58) Field of Search ................................ 370/229, 230, 370/235, 345, 412, 429, 433, 445, 458, 462; 709/102, 103, 235; 710/24, 25, 29, 263

(56) References Cited

U.S. PATENT DOCUMENTS

| | | | |
|---|---|---|---|
| 5,247,671 A | | 9/1993 | Adkins et al. |
| 5,255,371 A | * | 10/1993 | Latimer et al. ............... 710/24 |
| 5,528,513 A | * | 6/1996 | Vaitzblit et al. ............ 709/102 |
| 5,566,169 A | * | 10/1996 | Rangan et al. .............. 370/412 |

FOREIGN PATENT DOCUMENTS

| | | | |
|---|---|---|---|
| JP | 03155241 A | * | 3/1991 |
| JP | 3155241 | | 7/1991 |
| JP | 8226404 | | 9/1996 |

OTHER PUBLICATIONS

Venkatramani et al., Design, Implementation and Evaluation of a Sofware–based Real–Time Ethernet Protocol, SIG-COMM, pp. 27–37, 1995.*

Venkatramami et al., The Design, Implementation, and Evaluation of RETHER: A Real–Time Ethernet Protocol, University of New York, pp. 1–125, 1996.*

Yau et al., Operating System Techniques for Distributed Multimedia, University of Texas, pp. 1–22, Jul. 17, 1995.*

N. Nishio et al., "Conductor–Performer: A Middle Ware Architecture for Continuous–Media Applications", $1^{st}$ International Workshop on Real Time Operating Applications, 1994.

M. Isawaki et al., "A Micro–kernel for Isochronous Video–Data Transfer", Systems Development Lab. Hitachi, Ltd., Mar. 15, 1997.

(List continued on next page.)

Primary Examiner—Wellington Chin
Assistant Examiner—Frank Duong
(74) Attorney, Agent, or Firm—Antonelli, Terry, Stout & Kraus, LLP

(57) ABSTRACT

A data transfer management method and apparatus for reducing collision during data transfer. The invention stores a data length (m) in byte units of a plurality of packets capable of being transferred in a predetermined transmission time interval, stores the predetermined transmission time interval (t), accumulates the quantity of the packets to be transferred on a communication stream in the predetermined transmission time interval, and limits the quantity of the packets to be transferred to a value not greater then the data length (m).

13 Claims, 31 Drawing Sheets

OTHER PUBLICATIONS

Philippe Robin et al., Implementing a QoS Controlled ATM Based Communication System in Chorus, Dept. of Computing, Lancaster University Mar. 19, 1994, pp. 1–21.

Digital Equipment Corporation, Guide to DEC Threads, Jul. 1994.

J. Stankovic et al, "The Spring Kernel: A New Paradigm for Real–Time Operating Systems", 8283 Operating Systems Review (SIGOPS), Jul. 23, 1989, vol. 23, No. 3, pp. 54–71.

K. Ramaritham et al, "Scheduling Algorithms and Operating Systems Support for Real–Time Systems", 8078 Proceedings of the IEEE, vol. 82, No. Jan. 1994, No. 1, pp. 55–67.

C. Venkatramani, et al, "Design, Implemention, and Evaluation of a Software–based Real–time Ethernet Protocol", Department of Computer Science State University of New York at Stony Brook, SIGCOMM 1995, pp. 27–37.

C. Venkatramani, et al "The Design, Implementation and Evaluation of RETHER: A Real–time Ethernet Protocol", A Dissertation, 11/996, pp. 1–125.

R. Govindan, et al "Scheduling and IPC Mechanisms for Continuous Media" $13^{th}$ ACM Symposium on Operating Systems Principles, 1991, Computer Science Division Department of Electrical Engineering and Computer Science, pp. 1–13.

* cited by examiner

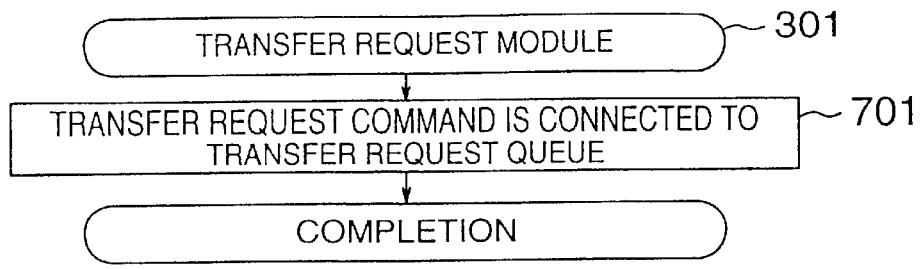
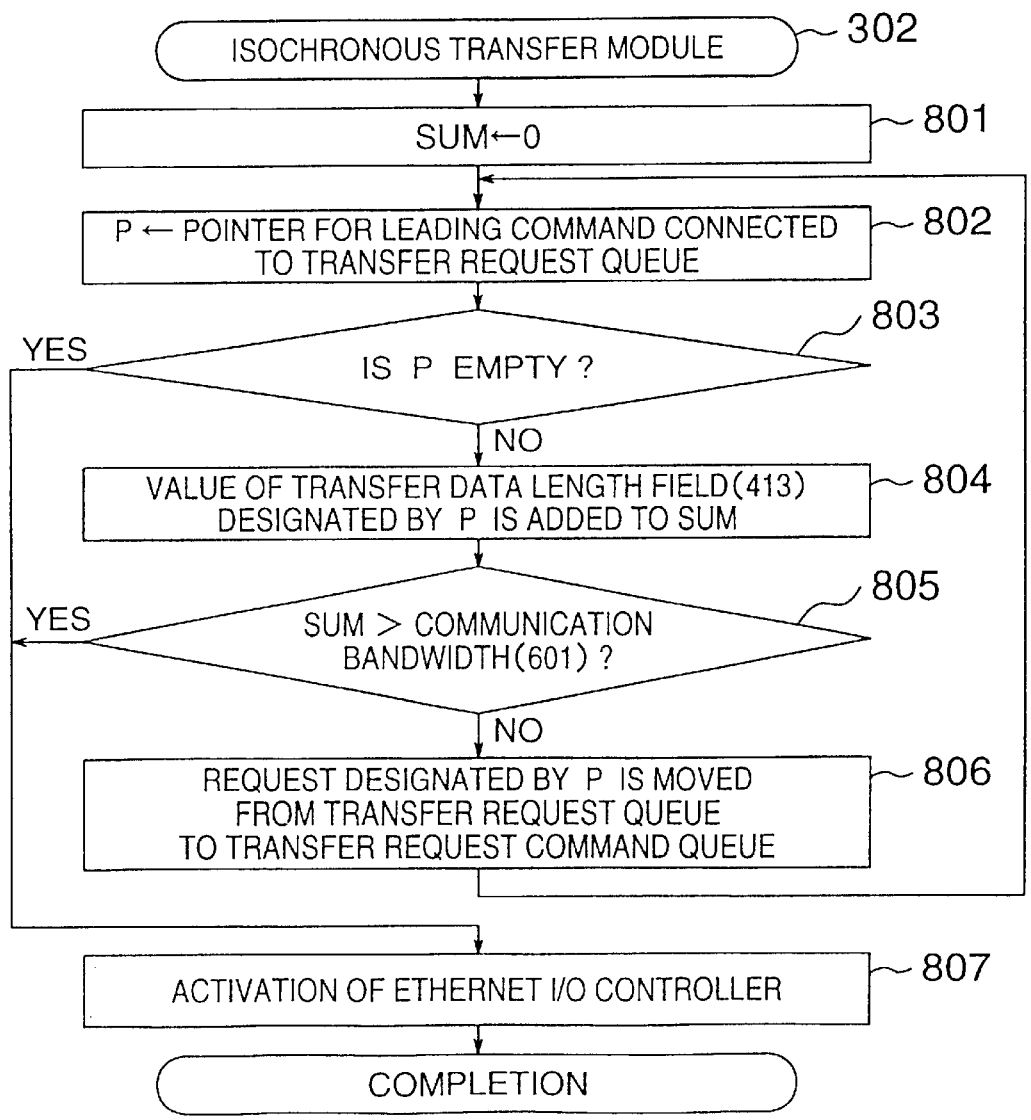

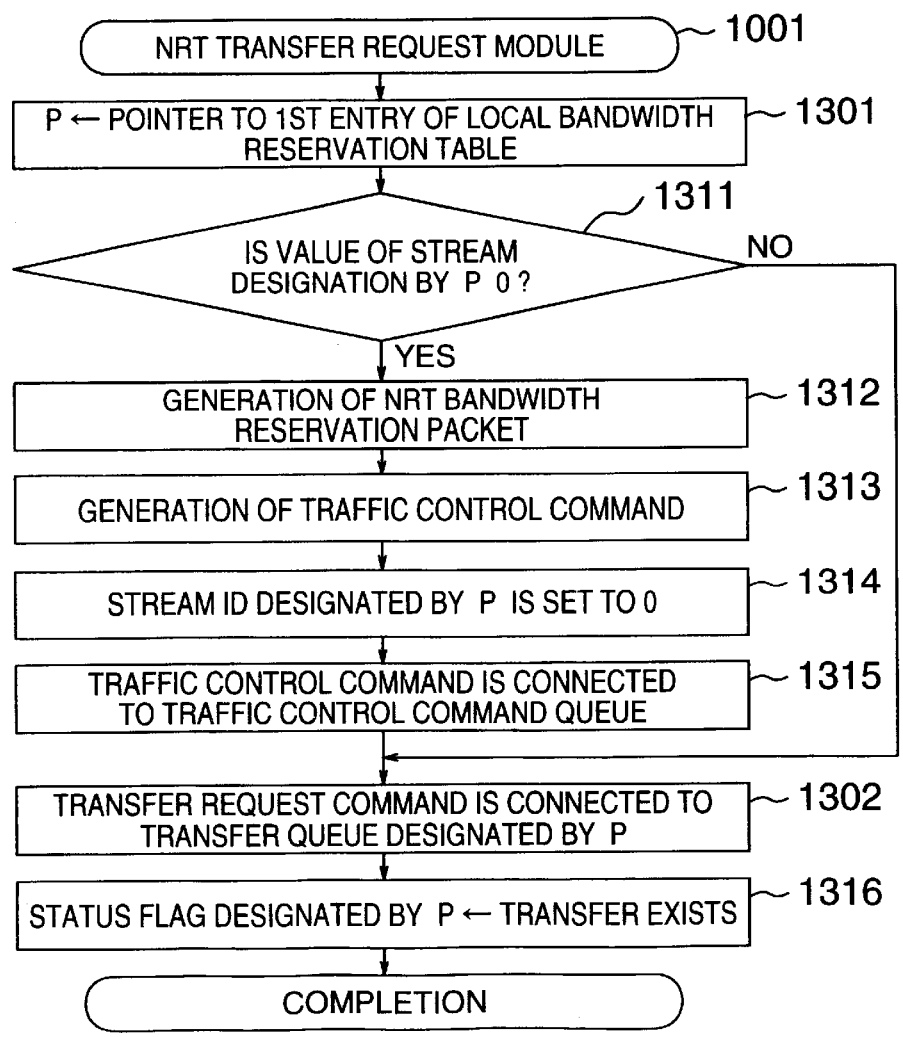

| STREAM ID (2511) | REQUESTER ADDRESS (2512) | ACCEPTANCE TIME (2513) | STATUS FLAG (2514) | REQUEST ID (2515) |
|---|---|---|---|---|
|  |  |  |  |  | ~2521
|  |  |  |  |  | ~2522
|  |  |  |  |  | ~2523
|  |  |  |  |  | ~2524
|  |  |  |  |  | ~2525

(table belongs to 2471)

| STREAM ID (2611) | REQUESTER ADDRESS (2612) | ACCEPTANCE TIME (2613) | STATUS FLAG (2614) | REQUEST ID (2615) | ALLOCATION BANDWIDTH (2616) |
|---|---|---|---|---|---|
|  |  |  |  |  |  | ~2621
|  |  |  |  |  |  | ~2622
|  |  |  |  |  |  | ~2623
|  |  |  |  |  |  | ~2624
|  |  |  |  |  |  | ~2625

(table belongs to 2472)

METHOD AND APPARATUS FOR EXECUTING COMMUNICATION IN REAL-TIME AND DATA STRUCTURE FOR REAL-TIME DATA COMMUNICATION

CROSS REFERENCE TO RELATED APPLICATION

This application is a continuation-in-part of patent application No. 08/824,338 entitled "PERIODIC PROCESS SCHEDULING METHOD" filed by T. Takeuchi et al. on Mar. 26, 1997 with foreign priority benefits based on Japanese patent application No. 8-073673 dated Mar. 28, 1996, and the content of which is incorporated herein by reference.

BACKGROUND OF THE INVENTION

This invention relates to data communication procedures of a network, and more specifically to bandwidth assurance in data communication using a CSMA/CD system.

C. Venkatramani, et al, Design, Implementation, and Evaluation of a Software-based Real-Time Ethernet Protocol, SIGCOMM '95 Cambridge, pp. 27–37, and C. Venkatramani, The Design, Implementation, and Evaluation of RETHER: A Real-Time Ethernet Protocol, Dept. of Computer Science, State University of New York at Stony Brook, 1996, pp. 1–125 describe an Ethernet protocol, hardwares and real-time and non-real-time communication.

JP-A-3-155241 teaches a LAN system using synchronous and asynchronous communication transfer slots.

The communication methods that have been used ordinarily in the LAN include a CSMA/CD system. Data transfer in data communication using this CSMA/CD system is executed in the following procedures.

a. A node or a computer requesting data transfer confirms the status of a stream.

b. Data transfer is commenced when the stress is empty, and is held on till the stream is empty, when the stream is not empty.

c. The node transferring the data compares the transmitted data with the status of the stream, and a plurality of nodes execute simultaneously the data transfer on the same stream and monitor whether or not any data collision occurs.

d. When the node transferring the data detects the data collision before the transfer is completed, it stops the transfer and transmits a collision signal representing the occurrence of the data collision to all the nodes on the stream.

e. The node transferring the data similarly stops the data transfer when it receives the collision signal before the data transfer is completed.

f. When the node transferring the data stops the data transfer in the case of the procedure d or e, a wait time is secured at random and then the data transfer procedure is repeated once again from the beginning.

g. When the data transfer is completed successfully by the procedures a to f, normal transfer completion is returned to the transfer request.

h. When the data transfer proves failure more than a predetermined number of times due to the data collision by the procedures a to d, the data transfer is stopped and a transfer error is sent back to the transfer request.

The node to which the data transfer is generated from the application, or the like, commences the data transfer at any time by the procedures described above.

According to this communication method, the stream is not occupied even during the transfer of large quantities of data and the node to which the data transfer request is generated can start the data transfer by a interrupting the transfer of large quantities of data. Therefore, this method has been used widely in the conventional data transfer which does not need the real-time feature.

In the data transfer of the CSMA/CD system, however, the loss of a packet or a lump of data as the data transfer unit, and delay, occur due to the collision with other data transfer. The problem of the loss of the packet, etc. can be solved by detecting time-out and executing re-transfer of the data in the data transfer that does not need the real-time feature. Nonetheless, the existing LAN using the CSMA/CD system cannot easily achieve communication that guarantees the real-time feature because the delay of the packet and the data re-transfer spoil the real-time feature of the communication.

A multimedia LAN system as one of the examples of the prior art technologies for solving such a problem is described in JP-A-3-155241.

The multimedia LAN system includes a specific apparatus for establishing synchronism as a whole among all the computers constituting the LAN system. To establish this synchronism throughout the whole LAN system, a time-slot for synchronization signal transfer, a time-slot for synchronous data transfer and a time-slot for asynchronous data transfer are disposed so that real-time multimedia data are transferred in a predetermined time interval in the time-slot for synchronization transfer while the times-lot for asynchronous signal transfer makes it possible to execute data transfer not requiring real-time feature by using an access system such as a CSMA/CD system.

A video conference system and a video-on-demand system are those applications which process consecutive media generated by digitizing speeches and dynamic images in real-time in a distributed environment using a network. Unless the communication data quantity per unit time is assured in the data communication in these applications, the data transfer cannot meet a playback processing of the consecutive media, so that the playback processing becomes incomplete and the interruption of the speech and disturbance of the images occur. In other words, to accomplish these applications, a data communication assuring the bandwidth, which in turn assures the communication data quantity per unit time, becomes essentially necessary.

The multimedia LAN system described above assures the bandwidth by using the time-slot for synchronization signal transfer and the time-slot for asynchronous signal transfer but when compared with the conventional LAN system using the CSMA/CD system, this system involves the problem that a specific apparatus which enables all the computers constituting the LAN system to establish synchronism throughout the whole LAN system must be provided. In other words, the existing LAN apparatus cannot be applied as they are and the change of the LAN specification is unavoidable.

SUMMARY OF THE INVENTION

To solve the problem described above, it is an object of the present invention to provide a system which can execute data communication assuring the real-time feature on the conventional LAN employing the CSMA/CD system.

It is another object of the present invention to provide a method and a system for controlling a transfer bandwidth in such a manner as to reduce packet collision during the data transfer.

In accordance with the present invention, there is provided a method of managing data communication comprising: a step of storing a plurality of transfer data lengths (M) that can be transferred within a predetermined transmission time interval, a step of storing said predetermined transfer time interval (t), a step of accumulating the quantity of data to be transferred through a communication stream within said predetermined transmission time interval, and a step of limiting the quantity of said data to be transferred to the value of said data lengths. It is possible to add a step of limiting the quantity of said data to be transferred within said predetermined transmission time interval to a value not greater than the balance obtained by subtracting a predetermined data length margin from the value of said data length. It will be possible to add a step of setting the time under the maximum data blank state, which is inputted by a client and is handled as the time used consecutively, as the time interval in which the transfer of a series of data is to be completed, a step of setting an allowable time determined to a considerably greater time by a server on the basis of said consecutive use time, and a step of detecting that the data received exceeds said consecutive use time. It will be able to provide a step of subtracting a data transfer bandwidth from said data length to cope with a request requesting the use of said data transfer bandwidth from one of a plurality of clients connected to said communication stream, a step of checking whether or not to release said data transfer bandwidth when non-reception of data is detected during said consecutive use time, and a step of adding said data transfer bandwidth to said data length when said data transfer bandwidth is released. It is possible to add a step of accumulating allocated bandwidths when the bandwidths of said communication stream are allocated so as to cope with the request requesting the use of the bandwidths of said data communication bandwidths so as to transmit a series of data from a plurality of clients connected to said communication stream, a step of checking whether or not to release said allocated data communication bandwidths when non-reception of data is detected during a predetermined consecutive use time of a series of data transfer, and subtracting a series of said data communication bandwidths from said accumulated bandwidths when said data communication bandwidths are released.

When a plurality of computers transfer simultaneously packets in a network employing a control mechanism for detecting the collision of the packets due to this simultaneous transfer and re-transferring automatically the packets and a computer network system in which these computers are connected by this network, the present invention holds temporarily the execution of the packet transfer request generated from a program operating on each computer, limits the data quantity transferred from each computer per unit time, and executes transfer control so that the traffic of the whole network does not exceed a predetermined value within the unit time. In this way, the present invention reduces the collision probability of the packets due to the simultaneous transfer and assures with a high probability that the relay time required for the packet transfer falls within an allowable value.

In the network and the computer network system described above, the present invention provides a traffic control mechanism including bandwidth allocation application means which uses at least one of the computers connected to the network as a global bandwidth reservation management node, and applies a bandwidth allocation request designating the bandwidth or a bandwidth allocation request not designating the bandwidth to the global bandwidth reservation management node before each computer which is to transfer the data starts the data transfer to the computer on the reception side, bandwidth allocation decision means which decides the bandwidth allocated to each computer from the bandwidth that the global bandwidth reservation management node can utilize on the network, the bandwidth allocation request designating the bandwidth applied and the bandwidth allocation request not designating the bandwidth which is applied, bandwidth allocation result report means which reports the allocation bandwidth so decided to the computer which applies the request or all the computers connected to the network, and transfer data quantity change means which sets a transmitting data quantity per unit time when each computer accepts the bandwidth allocation result. Using this traffic control mechanism, the present invention executes the traffic control so that the traffic of the entire network does not exceed a predetermined value within the unit time.

Before the data transfer not requiring the real-time feature is started, the bandwidth allocation request not designating the bandwidth is applied to the global bandwidth reservation management node and after this bandwidth allocation is accepted, the data quantity to be transmitted per unit time, which does not require the real-time feature, is set. On the other hand, before the data transfer requiring the real-time feature is started, the bandwidth allocation request designating the bandwidth is applied to the global bandwidth reservation management node and after this bandwidth allocation result is accepted, the data quantity to be transmitted per unit time, which requires the real-time feature, is set. As a result, even when the communication requiring the real-time feature and the communication not requiring the real-time feature exist in mixture, the real-time feature can be guaranteed with a high probability.

BRIEF DESCRIPTION OF THE DRAWINGS

FIG. 7 is a flowchart of a transfer request module in the embodiment 1;

FIG. 8 is a flowchart of an isochronous transfer module;

FIG. 12 is an explanatory view of a local bandwidth reservation table in the embodiment 2;

FIG. 13 is a flowchart of an NRT transfer request module of ordinary nodes in the embodiment 2;

DESCRIPTION OF THE PREFERRED EMBODIMENTS

Hereinafter, the first embodiment (embodiment 1) of the present invention will be explained in detail with reference to FIGS. 1 to 8. Constituent elements relating to the present invention will be first described briefly and then a processing procedure and a data structure will be explained in detail.

A network (LAN) dealt with in the present invention and the system constituent elements of both hardwares and softwares will be explained initially.

Figure 1:
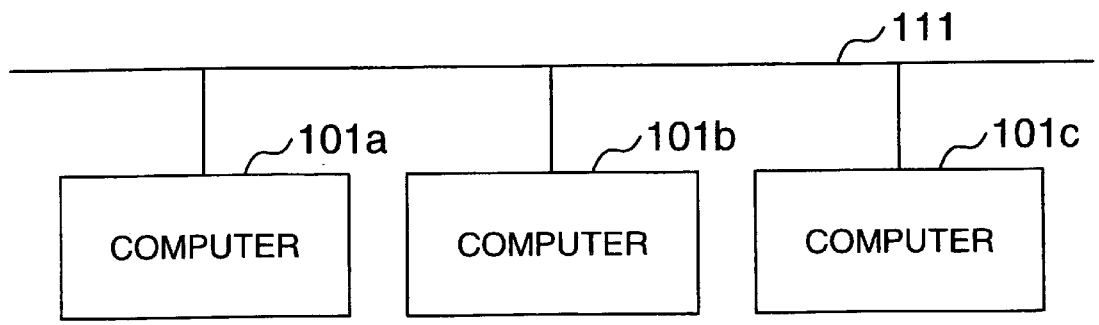
FIG. 1 is an explanatory view of constituent elements of a LAN according to the embodiment 1 of the present invention.

FIG. 1 depicts the connection state of the LAN constituent elements in the present invention. At least two computers (three, in the embodiment shown in FIG. 1) 101a, 101b and 101c are connected in the LAN through an Ethernet 111 which is a CSMA/CD system network having a retransfer function.

Figure 2:
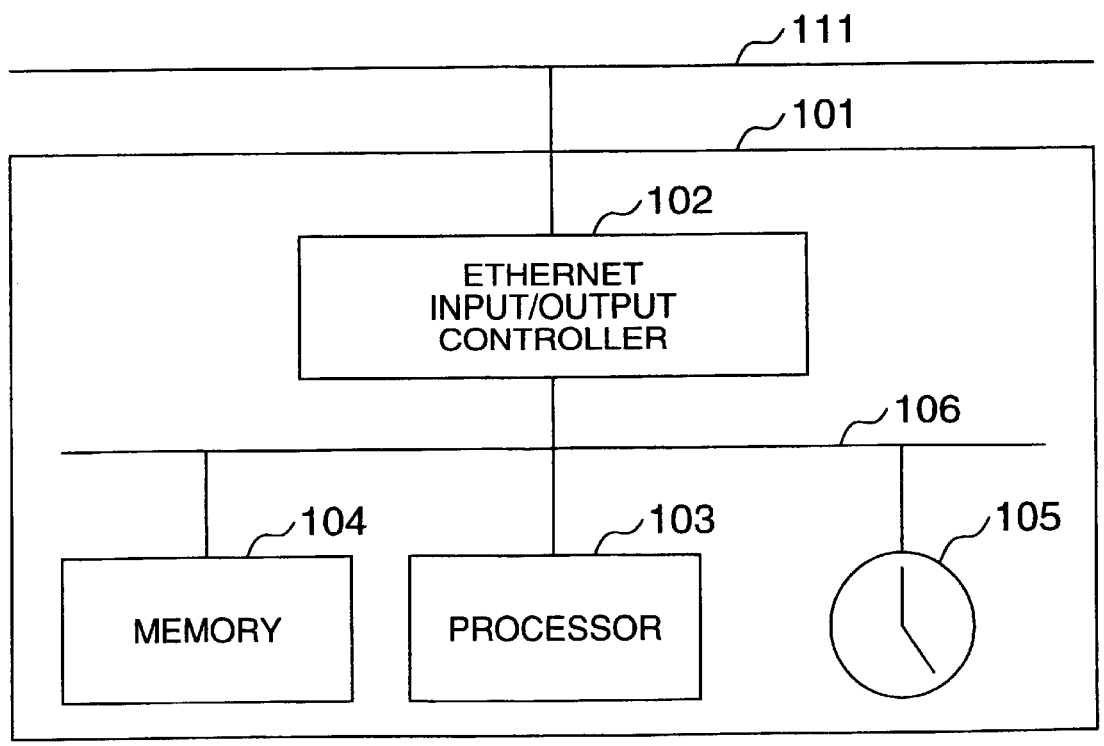
FIG. 2 is an explanatory view of hardware constituent elements.

FIG. 2 shows the hardware constituent elements in this embodiment. The computer 101 represents the hardware configuration of the computers 101a, 101b and 101c shown in FIG. 1. A processor 103, a main memory 104, an external timer 105 and an Ethernet input/output controller 102 are connected to one another in this computer 101 through a bus 106. The network 111 is connected to the Ethernet input/output controller 102.

The Ethernet input/output controller has a DMA transfer function and transfers the data between the main memory 104 and the Ethernet input/output controller 102 in accordance with a command from the processor 103. The command from the processor 103 to the Ethernet input/output controller 102 is given as an input/output command on the main memory 104. The Ethernet input/output controller 102 has a function of collectively processing a command chain formed by connecting a plurality of input/output commands by a pointer. The Ethernet input/output controller 102 has a function of generating an external interrupt to the processor when a processing of a series of input/output commands is completed.

The external timer 105 has a function of generating in a predetermined interval an external interrupt to the processor 103, and this interrupt time interval can be controlled by an operating system OS.

Figure 3:
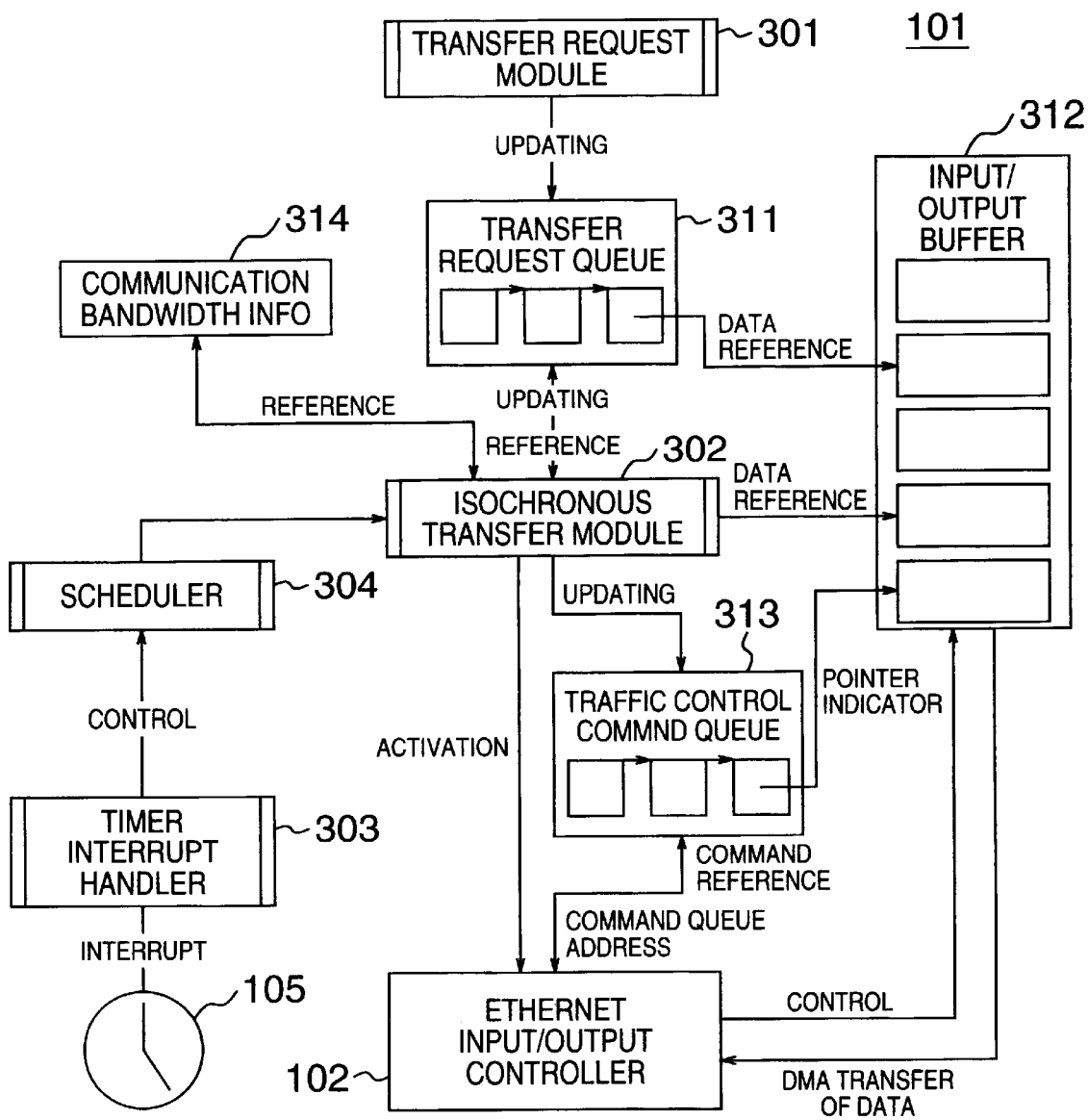
FIG. 3 is a block diagram of software constituent elements of the embodiment 1.

FIG. 3 shows several constituent elements associated with a computer software used in this embodiment. The hardwares such as the Ethernet input/output controller 102 and the transfer request module 301 are controlled by the operating system (not shown) lest an application program or a user process is illegally used. The user process indirectly utilizes these hardwares by generating a system call.

To process the data input/output or the transfer request generated from the user process, an input/output buffer 312, control data such as a transfer request queue 311, a transfer request command queue 313, and communication bandwidth information 314, and software modules such as a communication bandwidth information, etc. a transfer request module 301, an isochronous transfer module 302, a timer interrupt handler 303, a scheduler 304, etc. exist inside the operating system.

When the timer interrupt is generated at a predetermined timing, the processor interrupts the program which is presently executed, and activates the timer interrupt handler 303. This handler 303 activates in turn the isochronous transfer module 302 through the scheduler 304.

When the interrupt is generated from the Ethernet input/output controller 102, the processor 103 interrupts the program which is executed at present, and activates an input/output interrupt handler (not shown). This handler activates in turn the isochronous transfer module 302 through the scheduler 304.

Next, the principal data structures and the processing procedures will be explained with reference to FIGS. 3 to 7.

Figure 4:
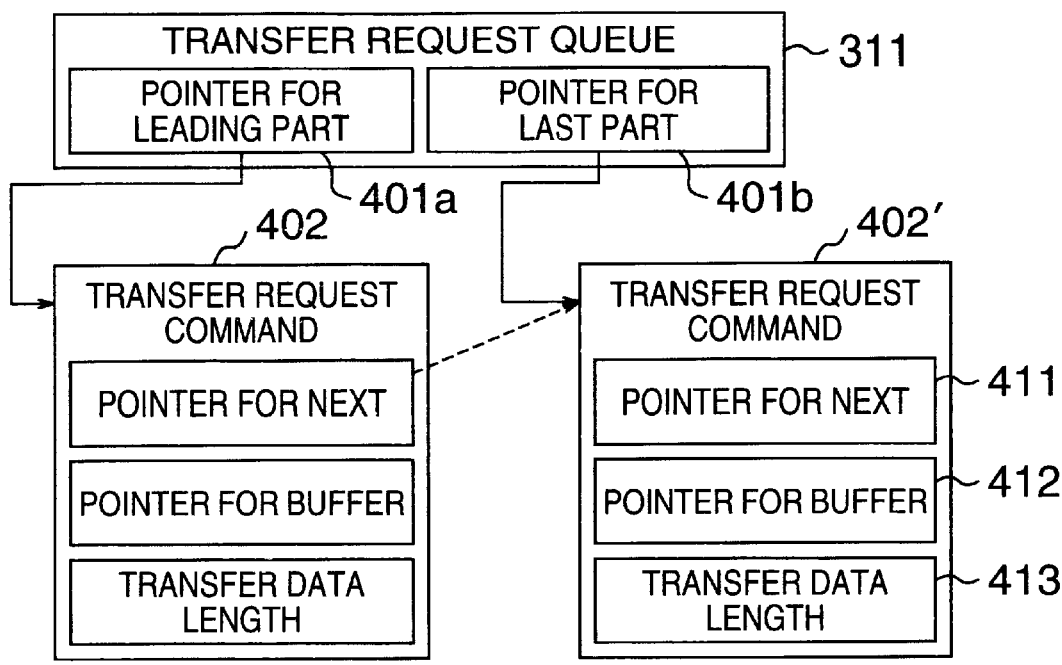
FIG. 4 is a block diagram of the structure of a transfer request.

FIG. 4 shows the structure of a transfer request queue 311 and that of a transfer request command 402. Transfer request commands 402 and 402' are connected to the transfer request queue 311.

Each transfer request command 402, 402' has the following fields.

1) pointer 411 for next request:
A pointer indicating a next request for chaining a plurality of transfer request commands.
2) buffer address 412:
This represents the leading address of a buffer having transfer data.
3) transfer data length 413:
This designates the size of the transfer data in a byte unit.

Figure 5:
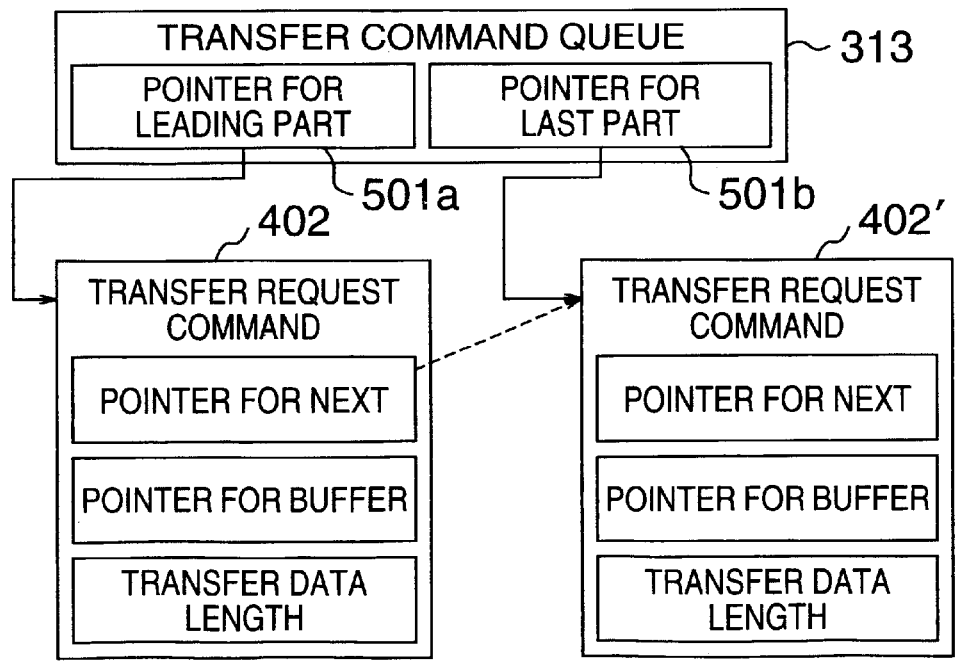
FIG. 5 is a block diagram of the structure of a transfer command.

FIG. 5 shows the structure of the transfer command queue 313. The transfer request commands 402 and 40' are connected to the transfer command queue 313.

Figure 6A:
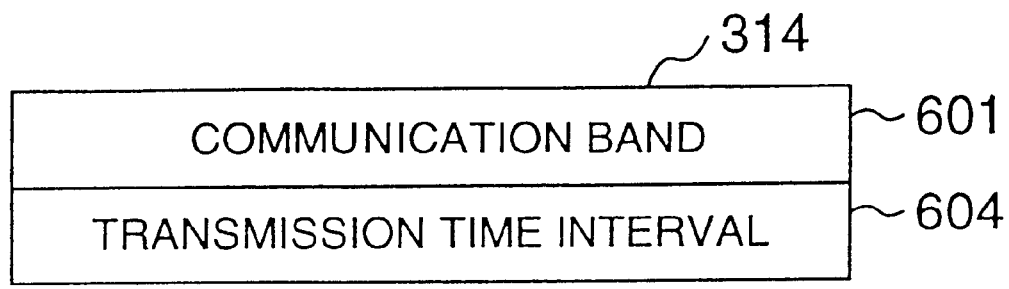
FIG. 6A is an explanatory view of the structure of a communication bandwidth information in the embodiment

FIG. 6A shows the structure of the communication bandwidth information 314. The communication bandwidth information 314 has the following fields.

a) communication bandwidth M 601:
This represents the upper limit value of the data length that can be transferred in each cycle of a plurality of packets transferred intermittently by the computer 101. This value M [byte] is calculated by the formula (1) given below, where C is the number of computers connected to the LAN (sets), V is the physical bandwidth of the LAN [byte/sec], t is the transfer cycle [sec] and R is a margin bandwidth as the data length secured for each transfer cycle 604:

$$M=(V\times t-R)/c \qquad (1)$$

b) transfer cycle t 604:
This represents the transfer cycle determined primarily by the LAN system of the present invention, and is assumed as 0.04 [sec], for example.

Figure 6B:
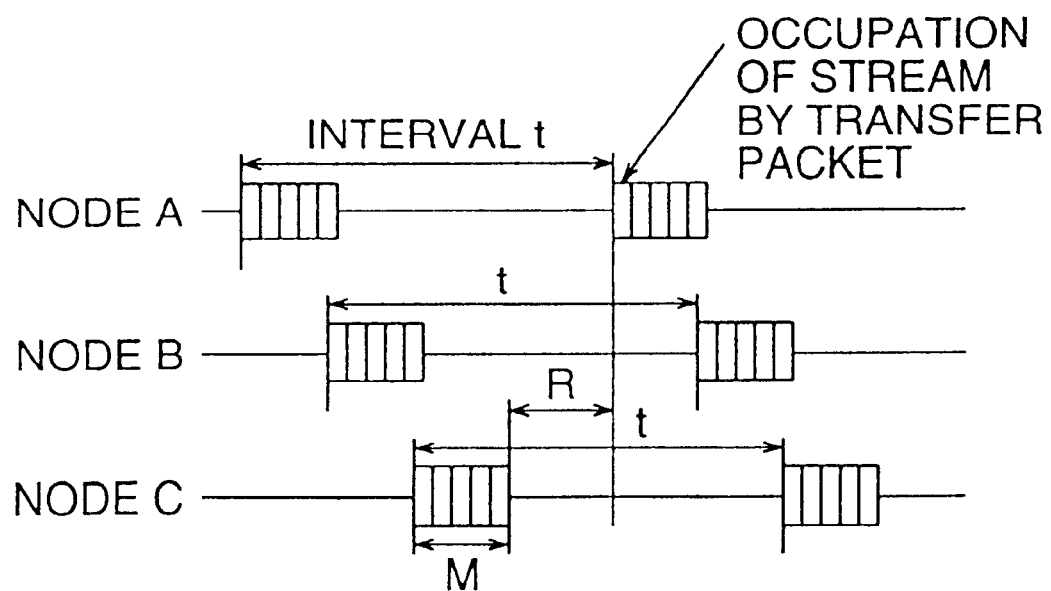
FIG. 6B is a timing chart showing the relationship between transfer and cycle in a plurality of nodes.

FIG. 6B shows the time relationship among the transfer cycle, the margin bandwidth, the communication bandwidth M and the number of modes C=3.

Next, the processing flow of the principal software modules shown in FIG. 3 will be explained.

FIG. 7 shows the processing flow of the transfer request module 301. The transfer request module provides means which enables the application to transfer data. The processor 103 generates afresh the transfer request command 402 at the step 701, stores the address of the transfer buffer in a buffer address field and stores the transfer data length in the byte unit in a transfer data length field 413. The transfer request command 402 generated at the step 701 is connected to the transfer request queue 311 at the step 702.

FIG. 8 shows the processing flow of the isochronous transfer module 302. The isochronous transfer module 302 is activated in the interval 604 of the transfer cycle. The value of a local variable sum representing the transfer request data length is cleared to 0 at the step 801. The address for the leading transfer request command 402 connected to the transfer request queue 311 is substituted for the local variable P representing the pointer for the transfer request at the step 802. When the value of the local variable P is NULL at the step 803, the flow proceeds to the step 807 and when the value is other than NULL, the flow proceeds to the step 804. At this step 804, the value of the transfer data length field 413 of the transfer request command 402 designated by the local variable P is added to the local variable sum. Next, whether or not the value of the local variable sum exceeds the communication bandwidth 601 of the communication bandwidth reservation 314 is checked at the step 805, and when if does not, the flow proceeds to the step 806. When the value sum exceeds the communication bandwidth 601, the flow proceeds to the step 807. At the step 806, the transfer request 402 designated by the local variable P is shifted from the transfer request queue 311 to the transfer request command queue 313 and then the flow proceeds to the step 802. At the step 807, on the other hand, after the pointer of the leading transfer command 402 of the transfer request command queue 313 is designated to the Ethernet input/output controller 102 and then activation is effected.

When activated by the isochronous transfer module 302, the Ethernet input/output controller 102 sends the data in accordance with the pointer 412 for the buffer and with the transfer data length field 413 in the connection sequence from the designated transfer request command 402 to the next pointer field 411 to the network 111 through the input/output buffer 312.

Because all the computers 101a, 101b and 101c connected to the network 111 follow the afore-mentioned formula (1), the quantity of the data delivered to the network 111 does not exceed the quantity of the data that can be transferred within the transfer cycle 604. Further, the delay due to the re-transfer can be absorbed inside the transmission interval time 604 by providing a bandwidth margin. For, the Ethernet 111 is a CSMA/CD system network having a re-transfer function and even when a collision occurs, re-transfer proves successful within the transmission interval time 604 as a margin is provided in such a manner as to secure an empty area for the data transfer within the interval time 604 set in the time in which the re-transfer function operates sufficiently. As a result, the probability of completion of the transfer can be improved.

Next, the second embodiment (embodiment 2) of the present invention which can achieve real-time communication by utilizing this operation will be explained in detail with reference to FIGS. 9 to 38. The constituent elements of this embodiment will be described first and then the processing procedures and the data structure will be explained in detail.

Figure 9:
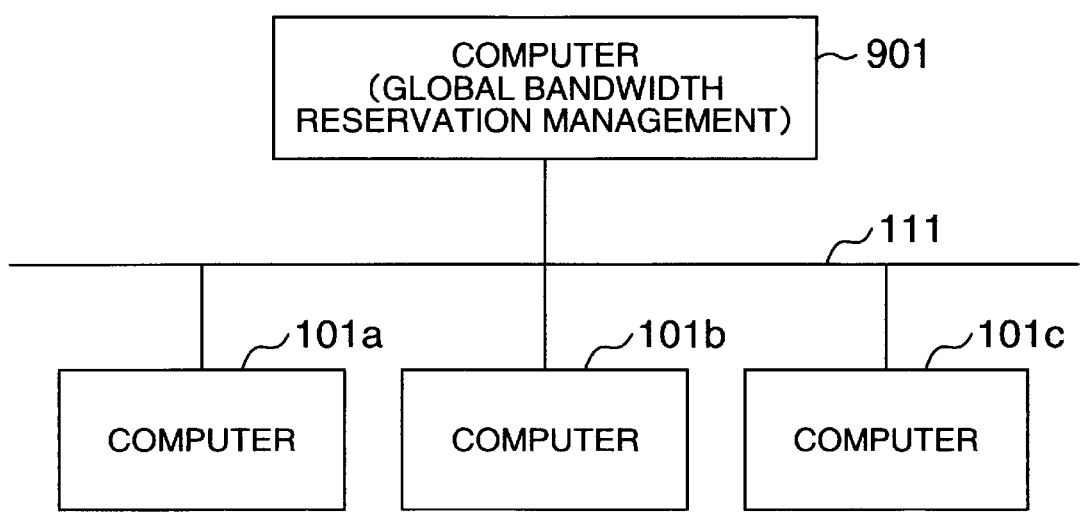
FIG. 9 is an explanatory view of constituent elements of a LAN in the embodiment 2 of the present invention.

FIG. 9 shows the LAN constituent elements of the present invention. In addition to the construction shown in FIG. 1, a computer 901 for globally managing the transfer requests from a plurality of nodes connected to the LAN is shown connected to the LAN. The hardware construction of the computer 901 does not at all alter from the construction of the computer 101 shown in FIG. 2.

Figure 10:
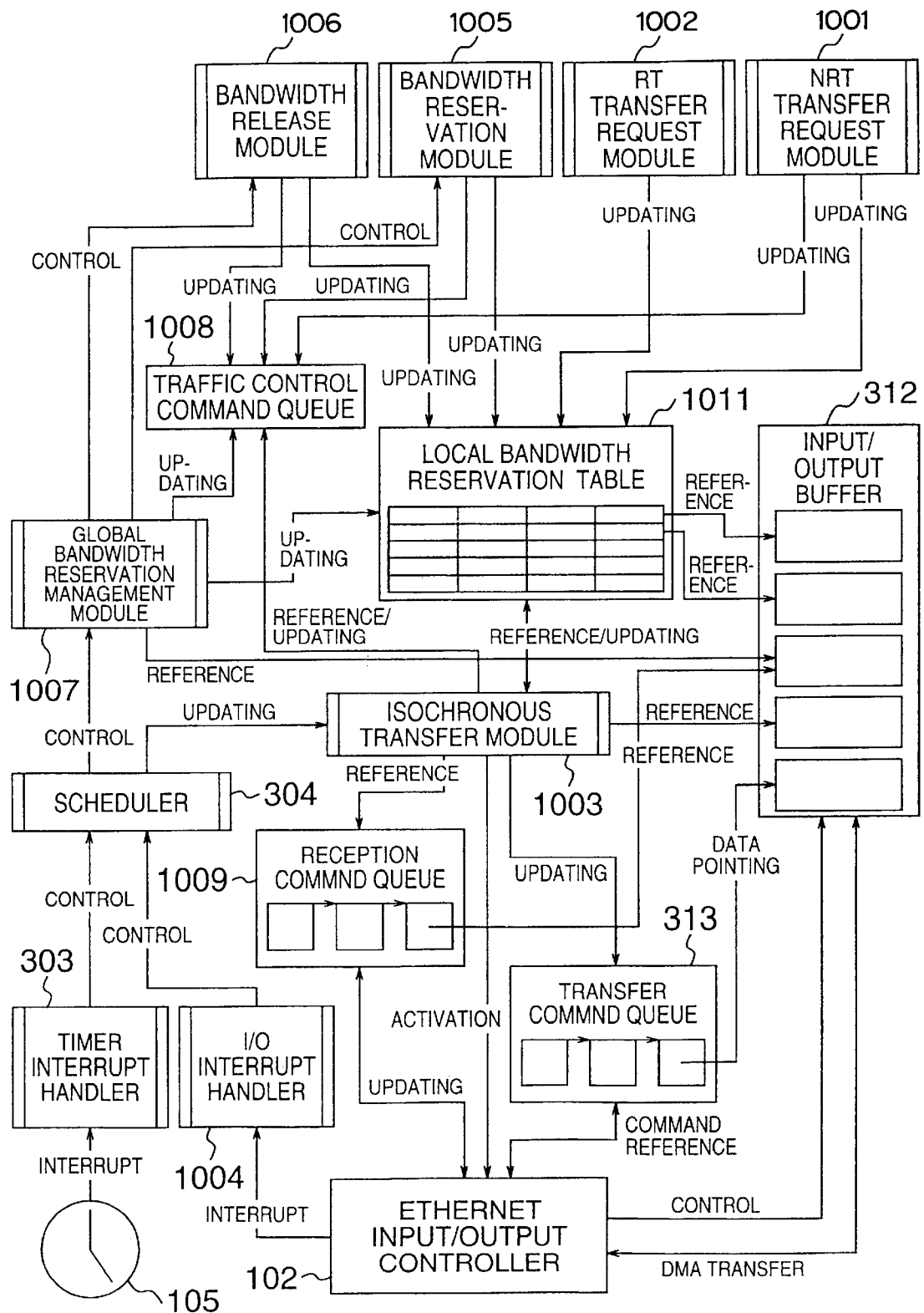
FIG. 10 is a block diagram of software constituent elements of ordinary nodes in the embodiment 2.
Figure 11:
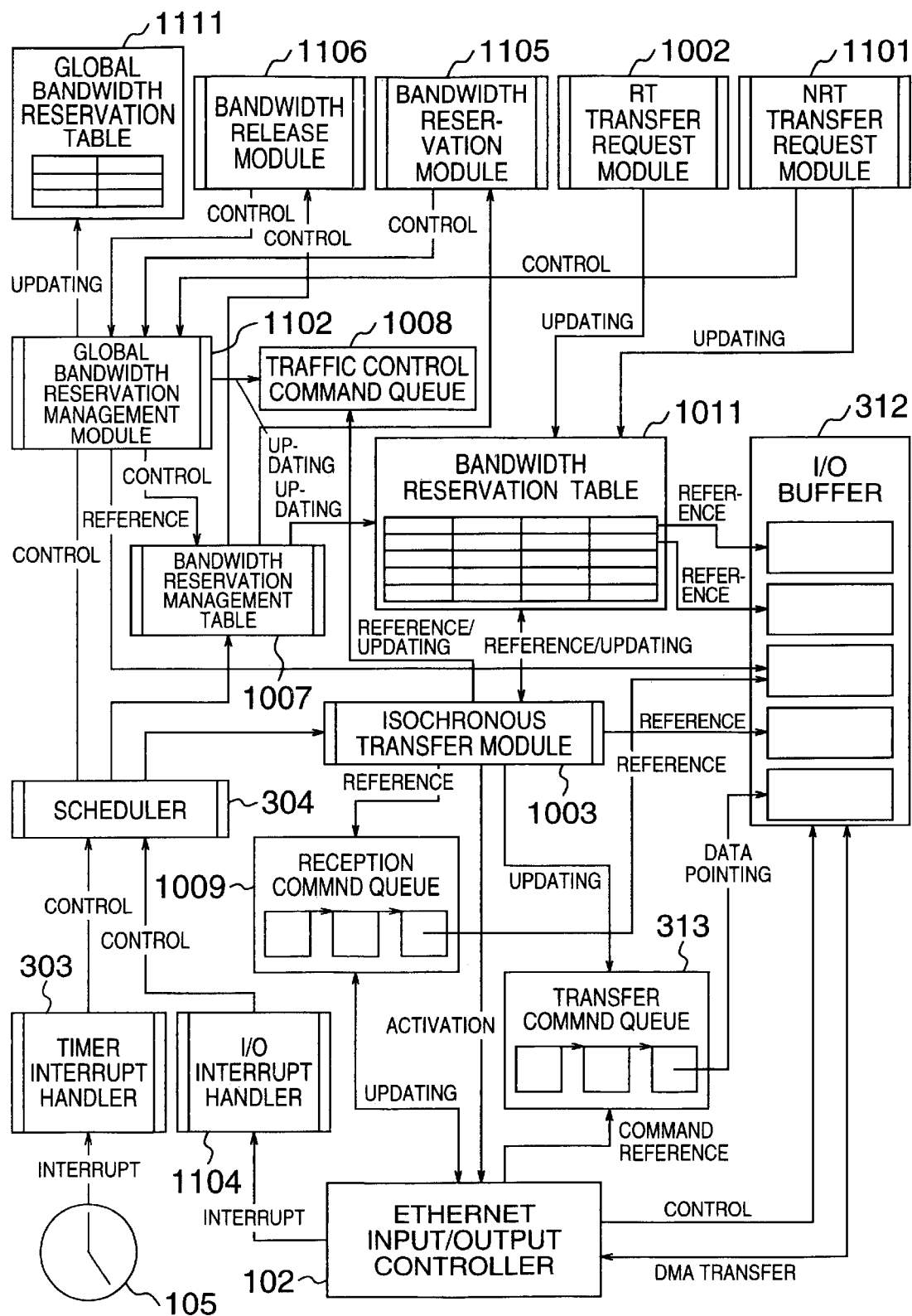
FIG. 11 is a block diagram of software constituent elements of a bandwidth reservation management node in the embodiment 2.

FIGS. 10 and 11 show the software constituent and 101c as the nodes and FIG. 11 shows the software constituent elements of the computer 901 as the global bandwidth reservation management node.

Referring to FIG. 10, in order to process the transfer request of the data generated from the user process, the input/output buffer 312, the control data such as the local bandwidth reservation table 1011, the transfer request command queue 313, the reception command queue 1009, the traffic control command queue 1008, etc., and the software modules such as the NRT (Non-Real-Time) transfer request module 1001, the RT (Real-Time) transfer request module 1002, the isochronous transfer module 1003, the bandwidth reservation module 1005, the bandwidth release module 1006, the local bandwidth reservation management module 1007, the timer interrupt handler 303, the input/output interrupt handler 1004, the scheduler 304, etc., are disposed inside the operating system.

When the timer interrupt occurs, the processor 103 interrupts the program that is executed at present, and activates the timer interrupt handler 303. This handler 303 activates in turn the isochronous transfer module 1003 and the local bandwidth reservation management table 1007 through the scheduler 304.

Referring to FIG. 11, in order the process the transfer request of the data generated from the user process, the input/output buffer 312, the control data such as the local bandwidth reservation table 1011, the transfer request command queue 313, the reception command queue 1009, the traffic control command queue 1008, the global bandwidth reservation table 1111, etc., and the software modules such as the NRT (Non-Real-Time) transfer request module 1101, the RT (Real-Time) transfer request module (1002), the isochronous transfer module 1003, the bandwidth reservation module 1105, the bandwidth release module 1106, the local bandwidth reservation management table 1007, the global bandwidth reservation management module 1102, the timer interrupt handler 303, the input/output interrupt handler 1104, the scheduler 304, etc., are disposed inside the operating system.

When the input/output completion interrupt occurs, the processor 103 interrupts the program that is executed at present, and activates the input/output interrupt handler 1104. This handler 1104 activates in turn the global bandwidth reservation management module 1102 through the scheduler 304.

Figure 37:
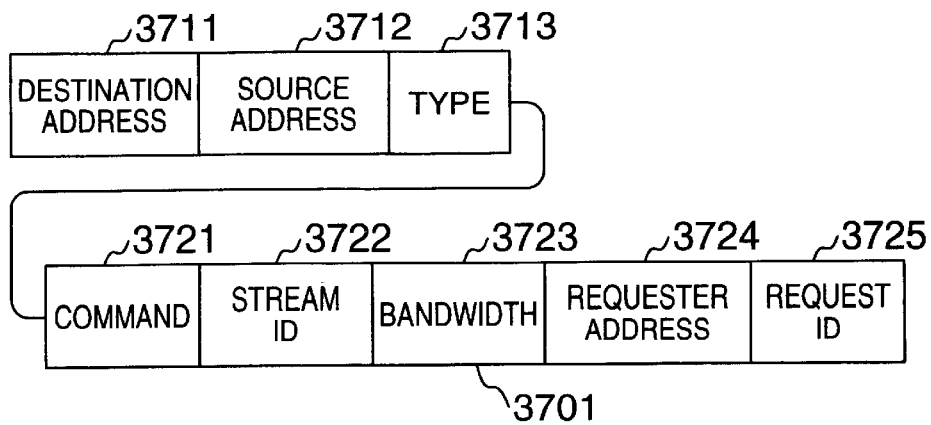
FIG. 37 shows the structure of a request packet in the embodiment 2.
Figure 38:
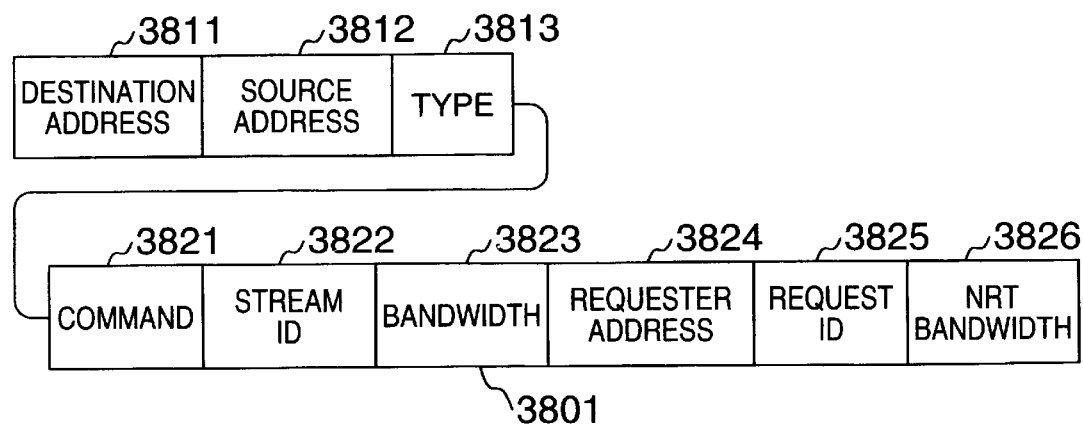
FIG. 38 shows the structure of an acknowledgement packet in the embodiment 2.

The nodes 101a, 101b and 101c and the global bandwidth reservation manager 901 exchange the reservation procedure of the bandwidth used for the data transfer before the data is transferred. FIGS. 37 and 38 show the structure of the control packet used for this procedure.

FIG. 37 shows the structure of the request packet 3701. The address which is used for identifying the destination node on the network 111 is stored in a destination address 3711, and the address used for identifying the source node on the network 111 is stored in a source address 3712. The value for judging that the data stored in the packet is the request packet when the node receives the packet is stored in a type 3713. The value for identifying the processing which the request packet requests to the global bandwidth reservation management node is stored in a command 3721. An identifier for identifying a communication stream as the object of the processing for allocating the communication stream is stored in a stream ID 3722. A requested bandwidth is stored in a bandwidth 3723. The address used for identifying a requester node on the network 111 is stored in a requester address 3724. The value which is primarily set by a requester so as to established correspondence to the acknowledgement packet is set to a request ID 3725.

FIG. 38 shows the structure of an acknowledgement packet 3801. The address used for identifying a destination node on the network 111 is stored in a destination address 3811. The address for identifying a source node on the network 111 is stored in a source address 3812. The value used for judging that the data stored in a packet is an acknowledgement packet when the node receives this packet is stored in a type 3813. The value used by the receiving node to identify a processing for bandwidth management is stored in a command 3821. An identifier for identifying a communication stream as the object of processing is stored in a stream ID 3822. An allocated RT bandwidth is stored in a bandwidth 3823. The address used for identifying a requester node on the network 111 is stored in a requester address 3824. The designated request ID 3725 is set to a request ID 3825 when a request packet exists and 0 is set when the corresponding request packet does not exist.

Next, the principal data structures shown in FIG. 10 will be explained.

The traffic control command queue 1008 and the reception command queue 1009 have exactly the same structure as the transfer request queue shown in FIG. 4.

FIG. 12 shows the structure of the local bandwidth reservation table 1011. This table 1011 has entries 1211 to 1215 for each stream of the RT transfer and for the NRT transfer. Each entry comprises a stream ID field 1201 representing an identifier of the stream, a bandwidth field 1202 representing an allocated communication bandwidth, a bandwidth updating time field 1203 for storing the time of permission of the allocation or continuation of the bandwidth, a status flag field 1204 representing the status of each entry and a transfer request queue 401 for queuing the transfer requests. The first entry 1211 of the local bandwidth reservation table 1011 is a specific entry which represents the information on the NRT transfer request.

Next, each module shown in FIG. 10 will be explained with reference to FIGS. 13 to 23.

FIG. 13 shows the processing flow of the NRT transfer request module 1001. This is the module which the user of the NRT transfer calls. The processor sets a pointer for the first entry 1211 of the local bandwidth reservation table 1011 to a local variable P representing the pointer to the entries of this table 1011, at the step 1301.

At the next step 1311, the value of the stream ID represented by the local variable P is checked. When it is 0, the flow proceeds to the step 1312 so as to secure the NRT bandwidth and when it is not 0, the flow proceeds to the step 1302. The processor secures the input/output buffer 312 at the step 1312 for the packet request for bandwidth reservation which is the request packet 3701 for the bandwidth reservation. Next, the processor sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, 0 to the bandwidth field 3723 and the values which can be mutually identified to the request ID field 3725. At the next step 1313, the processor secures the transfer request command 402 for the traffic control command that requests the transfer of the bandwidth reservation packet 3701, and sets the address of the bandwidths reservation packet 3701 to the pointer field 412 for the buffer of the transfer request command 402 so secured and the data length of the bandwidth reservation packet 3701 to the transfer data length field 413. At the step 1£14, 1 is set to the stream ID represented by the local variable P while 0 is set to the bandwidth represented by the local variable P lest the bandwidth reservation occurs in multiplicity and the bandwidth is used before the bandwidth reservation is confirmed. At the step 1315, the transfer request command 402 secured at the step 1313 is connected to the traffic control command queue 1008.

At the step 1302, the transfer request command 402 designated by the user program is connected to the transfer request queue 401 of the entry designated by the local variable P.

At the step 1316, the value representing that the transfer exists is set to the status flag field 1204 designated by the local variable P.

The NRT transfer request module 1001 can provide the interface for accepting the NRT data transfer to the user program in the following way. Namely, the user program activates the NRT transfer request module by using the following function.

<function name>
  send_NRT(qh)
<argument>
  qh: pointer for the queue connecting transfer request command
<explanation>
  The module is activated when data transfer is made by using NRT stream. User program uses queue qh chaining transfer requests and accepts a plurality of transfer requests at one time. NRT transfer is executed in the sequence of acceptance.

Figure 14:
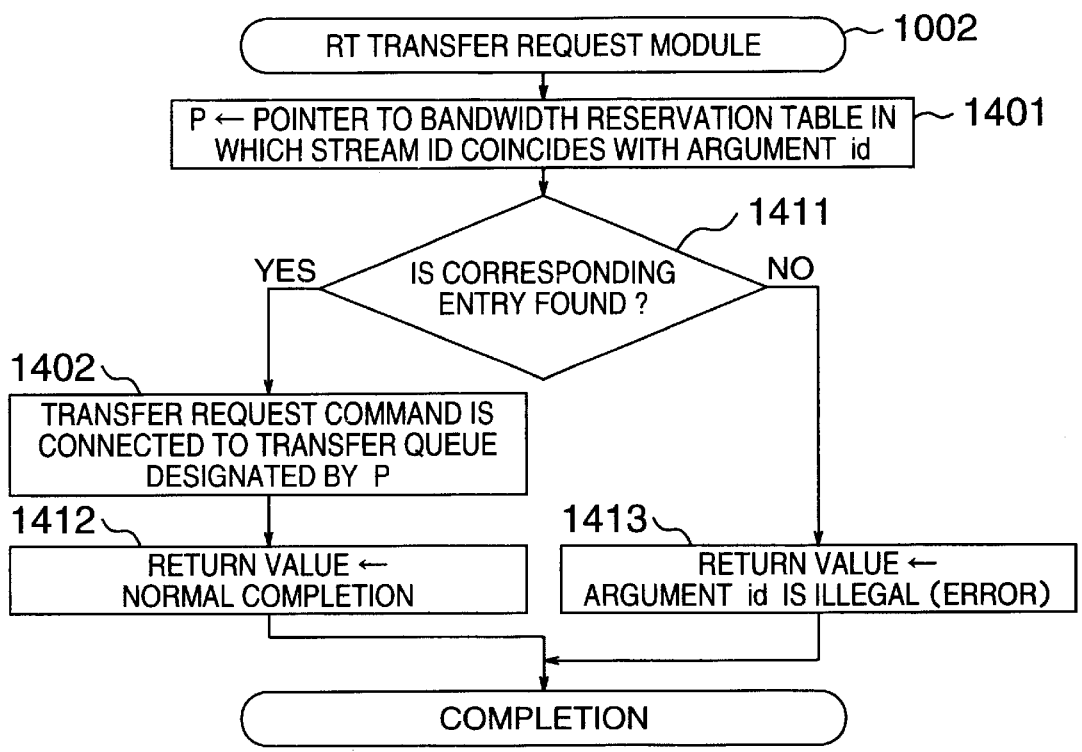
FIG. 14 is a flowchart of an RT transfer request module in the embodiment 2.

FIG. 14 shows a processing flow of the RT transfer request module 1002. At the step 1401, a pointer for the entry of the local bandwidth reservation table 1011 whose argument id coincides with the stream ID of this table 1011 is set to the local variable P representing the pointer to the entries of this table 1011.

At the step 1411, whether or not the entry of the local bandwidth reservation table 1011 whose argument id coincides with the stream ID of the local bandwidth reservation table 1011 exists is checked, and when it does, the flow proceeds to the step 1402 and when it does not, the flow proceeds to the step 1413.

At the step 1402, the transfer request command 402 designated by the user program is connected to the transfer request queue 401 of the entry designated by the local variable P.

At the step 1412, the value representing normal completion is set to a return value and a series of processings are completed. The value representing that the argument id is illegal is set to the return value at the step 1413 and a series of processings are completed.

The RT transfer request module 1002 provides an interface for accepting RT data transfer to the user program in the following way.
<function name>
  send_RT(id, qh)
<argument>
  id: stream ID representing stream having secured bandwidth
  <explanation>
  RT data transfer is executed by using a stream having stream ID id. User program uses queue qh changing transfer requests and accepts once a plurality of transfer requests.

Figure 15:
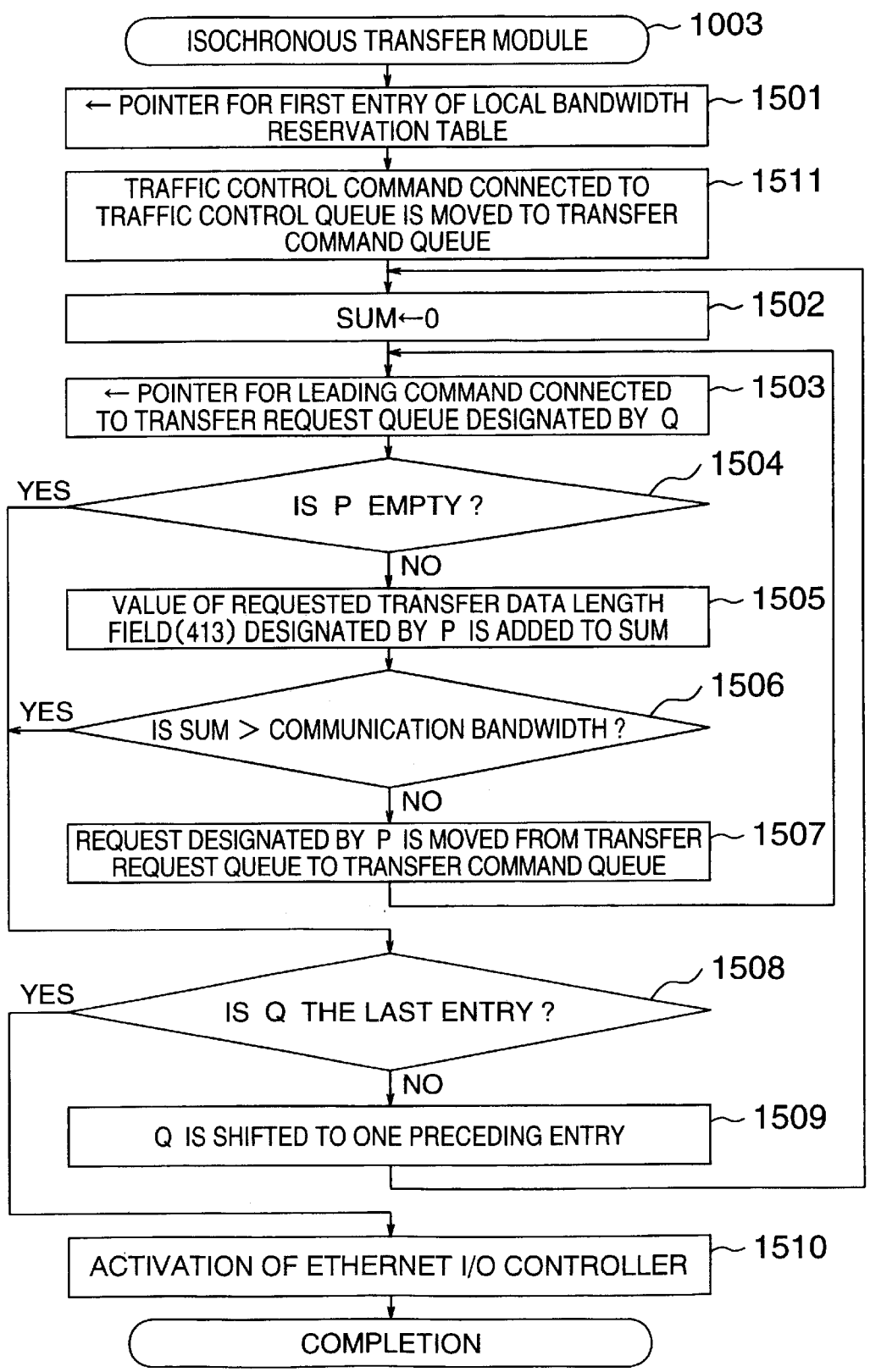
FIG. 15 is a flowchart of an isochronous transfer module in the embodiment 2.

FIG. 15 shows a processing flow of the isochronous transfer module 1003. The isochronous transfer module 1003 is activated in the interval set to the timer interrupt handler 303, such as in a 40-msec interval. At the step 1501, the processor sets the pointer for the first entry 1211 of the local bandwidth reservation table 1011 to the local variable P representing the pointer to the entries of the local bandwidth reservation table 1011.

At the step 1511, the transfer request command 402 connected to the traffic control command queue 1008 is moved to the transfer command queue 313.

At the step 1502, the value of the local variable sum representing the transfer request data length is cleared to 0. At the next step 1503, the address for the leading transfer request command 402 connected to the transfer request queue 401 of the entry designated by the local variable Q is substituted for the local variable P representing the pointer to the transfer request. At the step 1504, when the value of the local variable P is an invalid value, the flow proceeds to the step 1508 and when it is a value other than the invalid value, the flow proceeds to the step 1505. At this step 1505, the value of the transfer data length field 413 of the transfer request 402 designated by the local variable P is added to the local variable sum. Whether or not the value of the local variable sum exceeds the value of the bandwidth field 1202 of the entry designated by the local variable Q is checked at the step 1506. When it does not, the flow proceeds to the step 1507 and when it does, the flow proceeds to the step 1508. At the step 1507, the transfer request 402 designated by the local variable P is moved to the transfer command queue 313 from the transfer request queue 401 of the entry designated by the local variable Q and the flow proceeds to the step 1503. Whether or not the local variable Q is the last entry of the local bandwidth reservation table 1011 is checked at the step 1508 and when it is the last entry, the flow proceeds to the step 1510 and when it is not, the flow proceeds to the step 1509. At this step 1509, the local variable Q is set to the pointer for the entry next to the entry designated by this local variable Q and then the flow proceeds to the step 1502. At the step 1510, the pointer of the leading transfer request command 402 of the transfer request command queue 313 is designated to the Ethernet input/output controller 102 to activate it, and a series of processings are completed.

Figure 16:
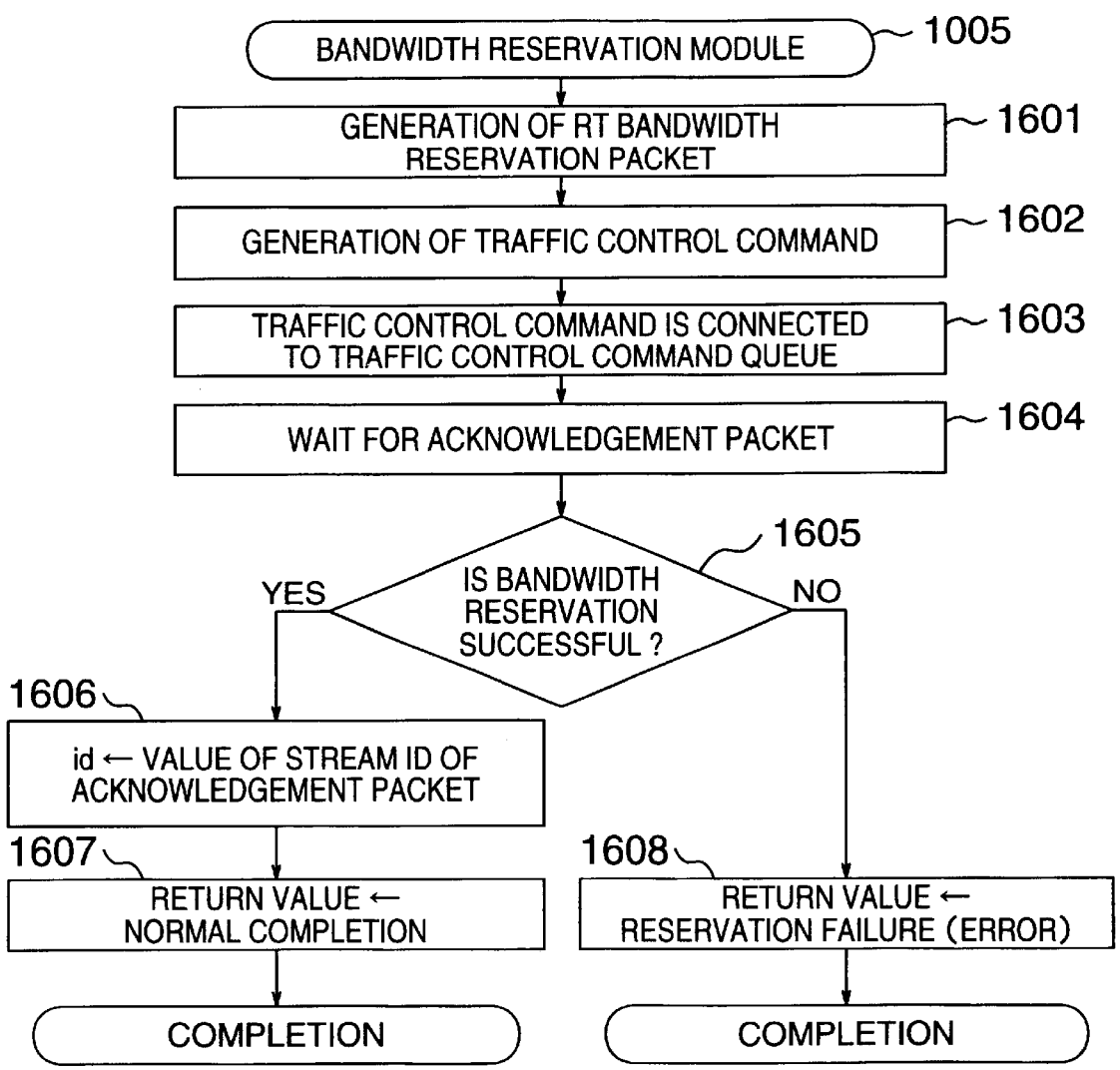
FIG. 16 is a flowchart of a bandwidth reservation module of ordinary nodes in the embodiment 2.

FIG. 16 shows a processing flow of the bandwidth reservation module 1005. At the step 1601, the processor secures the input/output buffer 312 for the bandwidth reservation packet as the request packet 3701 for the bandwidth reservation, and sets the address of the bandwidth reservation manager 901 to the destination address field 3711 of the request packet 3701 so secured, the address of its own to the source address field 3712 and to the requester address field 3712, the value representing the request packet to the type field 3713, the value representing the bandwidth reservation to the command field 3721, the value designated by the argument bw to the bandwidth field 3723, and a primary value to the request ID field 3725. At the step 1602, the processor secures the transfer request command 402 for the traffic control command requesting the transfer of the bandwidth reservation packet 3701 and sets the address of the bandwidth reservation packet 3701 to the pointer field 412 for the buffer of the transfer request command 402 so secured and the data length of the bandwidth reservation packet 3701 to the transfer data length field 413. At the step 1603, the processor connects the transfer request command 402 secured at the step 1602 to the traffic control command queue 1008. The processor waits for the arrival notification of the acknowledgement packet 3801 representing the coincidence of the request ID field of the bandwidth reservation packet 3701 with the request ID field 3825 of the acknowledgement packet 3801 at the step 1604. When the value of the bandwidth field 3823 of the acknowledgement packet 3801 receiving the arrival notification coincides with the value designated by the argument bw at the step 1605, the flow proceeds to the step 1606 and when it does not, the flow proceeds to the step 1608. The value of the identifier field 3822 of the acknowledgement packet 3801 is set to the area designated by the argument id at the step 1606. At the step 1607, the value representing normal completion is set at a return value and a series of processings are completed. On the other hand, a value representing the failure of the bandwidth reservation is set as the return value and a series of processings are completed at the step 1608.

The bandwidth reservation module 1005 provides the interface for accepting the bandwidth reservation to the user program in the following way.

<function name>
  reserve_bandwidth (bw, id)
<argument>
  bw: bandwidth requested by user
  id: pointer to area for storing stream ID representing stream having secured bandwidth
<explanation>
  The stream having the bandwidth bw is secured. When this securing proves successful, the return value representing normal completion is obtained and when securing proves unsuccessful, a return value representing the failure of the bandwidth reservation is obtained. To execute the RT communication, the RT transfer request module is activated by using the stream ID obtained by this function, and the RT communication is thereafter executed.

Figure 17:
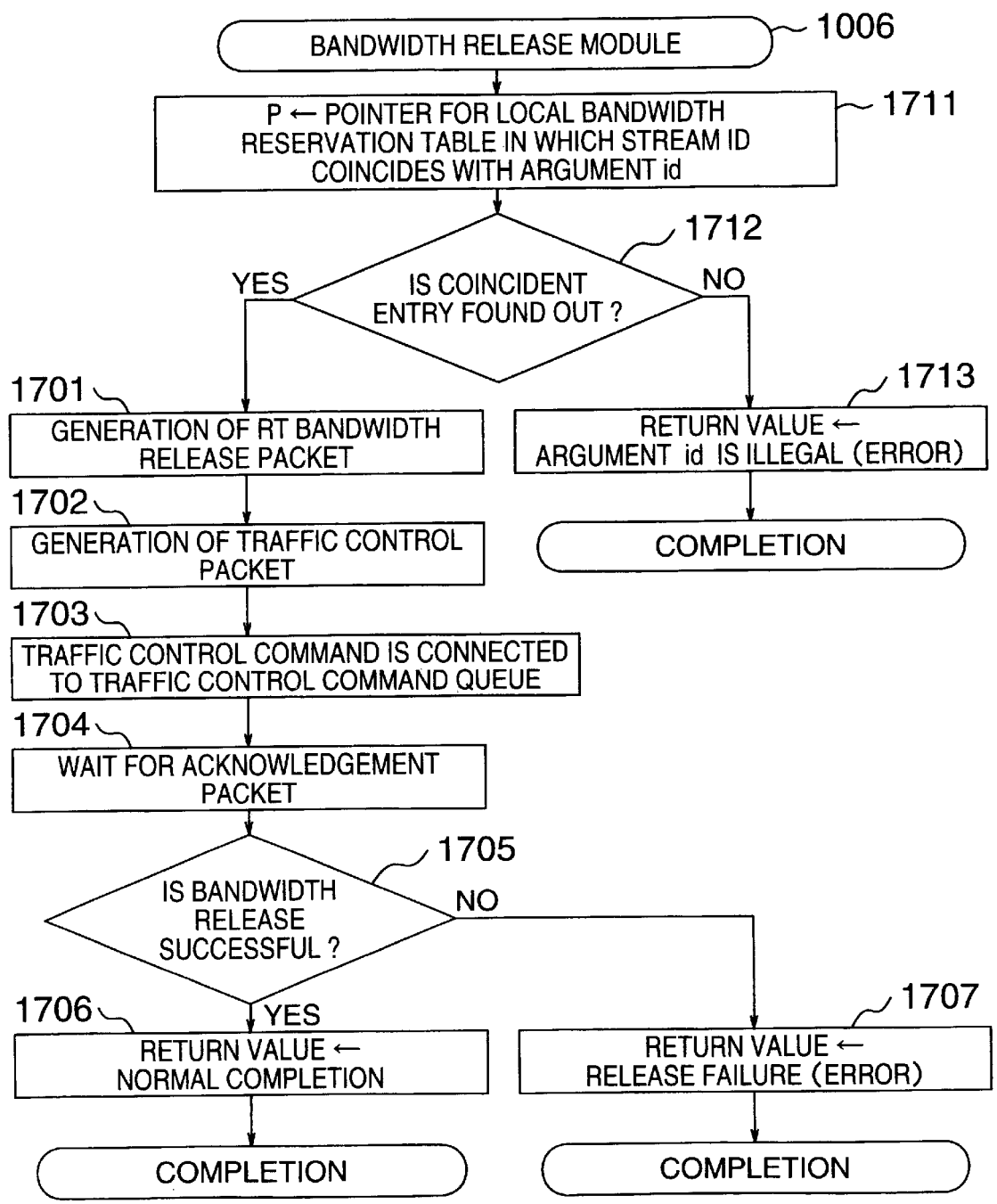
FIG. 17 is a flowchart of a bandwidth release module of ordinary nodes in the embodiment 2.

FIG. 17 shows a processing flow of the bandwidth release module 1006. At the step 1711, the processor sets the pointer for the entries of the local bandwidth reservation table 1011 in which the argument id coincides with the stream ID of the local bandwidth reservation table 1011 to the local variable P representing the pointer for the entries of the local bandwidth reservation table 1011. At the step 1712, whether or not the entry of the local bandwidth reservation table 1011 in which the argument id coincides with the stream ID of the local bandwidth reservation table 1011 exists is checked, and when such an entry exists, the flow proceeds to the step 1701 and when it does not, the flow proceeds to the step 1713, from the step 1712.

At the step 1701, the processor secures the input/output buffer 312 for the bandwidth release packet as the request packet 3701 for releasing the bandwidth, and sets the address of the global bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3721, the value of the stream ID field 1201 designated by the local variable P to the stream ID field, the value of the bandwidth field 1202 designated by the local variable P to the bandwidth field 3723 and a primary value to the request ID field 3725.

At the step 1702, the processor secures the transfer request command 402 for the traffic control command requesting the transfer of the bandwidth release packet 3701, and sets the address of the bandwidth release packet 3701 to the pointer field 412 for the buffer of the transfer request command 402 so secured and the data length of the bandwidth release packet 3701 to the transfer data length field 413. At the step 1703, the transfer request command 402 secured at the step 1702 is connected to the traffic control command queue 1008. At the step 1704, the processor waits for the arrival notification of the acknowledgement packet 3801 in which the request ID field 3725 of the bandwidth release packet 3701 coincides with the value of the request ID field 3825 of the acknowledgement packet 3801 from the local bandwidth reservation management module 1007. At the step 1705, whether or not the value of the bandwidth field 3823 of the acknowledgement packet 3801 receiving the arrival notification is 0 is checked, and when this value is other than 0, the flow proceeds to the step 1706 and when it is 0, the flow proceeds to the step 1707. At the step 1706, the processor sets the value representing normal completion as the return value and completes a series of processings. At the step 1706, the processor sets the value representing the failure of the bandwidth reservation as the return value and completes a series of processings. At the step 1713, the processor sets the value representing that the argument id is illegal to the return value and completes a series of processings.

The bandwidth release module 1006 provides the interface for accepting the bandwidth release to the user program in the following way.
<function name>
  cancel_bandwidth (id)
<argument>
  id: stream ID representing stream having bandwidth to be released
<explanation>
  This module is activated when the stream having the stream ID id is released after completion of the transfer. When this release proves successful, a return value representing normal completion is obtained and when the release proves unsuccessful, a value representing the failure of the bandwidth release is obtained. The stream ID which has succeeded in the release by using this function becomes invalid.

Figure 18:
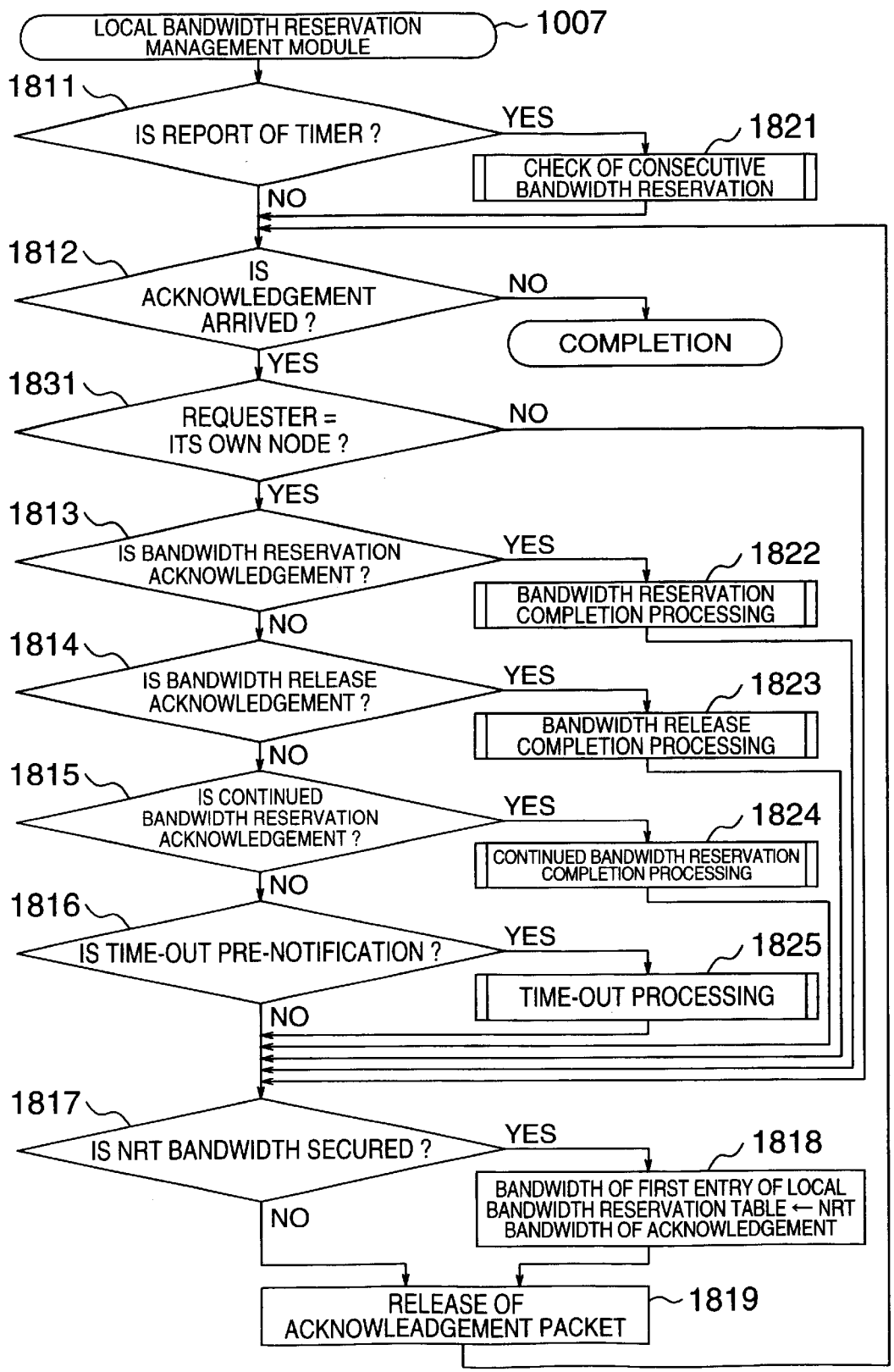
FIG. 18 is a flowchart of a local bandwidth reservation management module in the embodiment 2.

FIG. 18 shows a processing flow of the local bandwidth reservation management module 1007. This local bandwidth reservation management module 1007 is activated in the interval set to the timer interrupt handler 303, such as 40 msec, for example, through the scheduler 304. The local bandwidth reservation management module 1007 is also activated through the scheduler 304 whenever the packet to be processed by this module 1007 arrives. At step 1811, the processor judges whether or not the call of the module results from the timer interrupt and when it does, the flow proceeds to the step 1821 and when it does not, the flow proceeds to the step 1812. A series of processings for requesting the consecutive bandwidth reservation are executed at the step 1821 before the term of use of the bandwidth shown in FIG. 19 expires.

Figure 20:
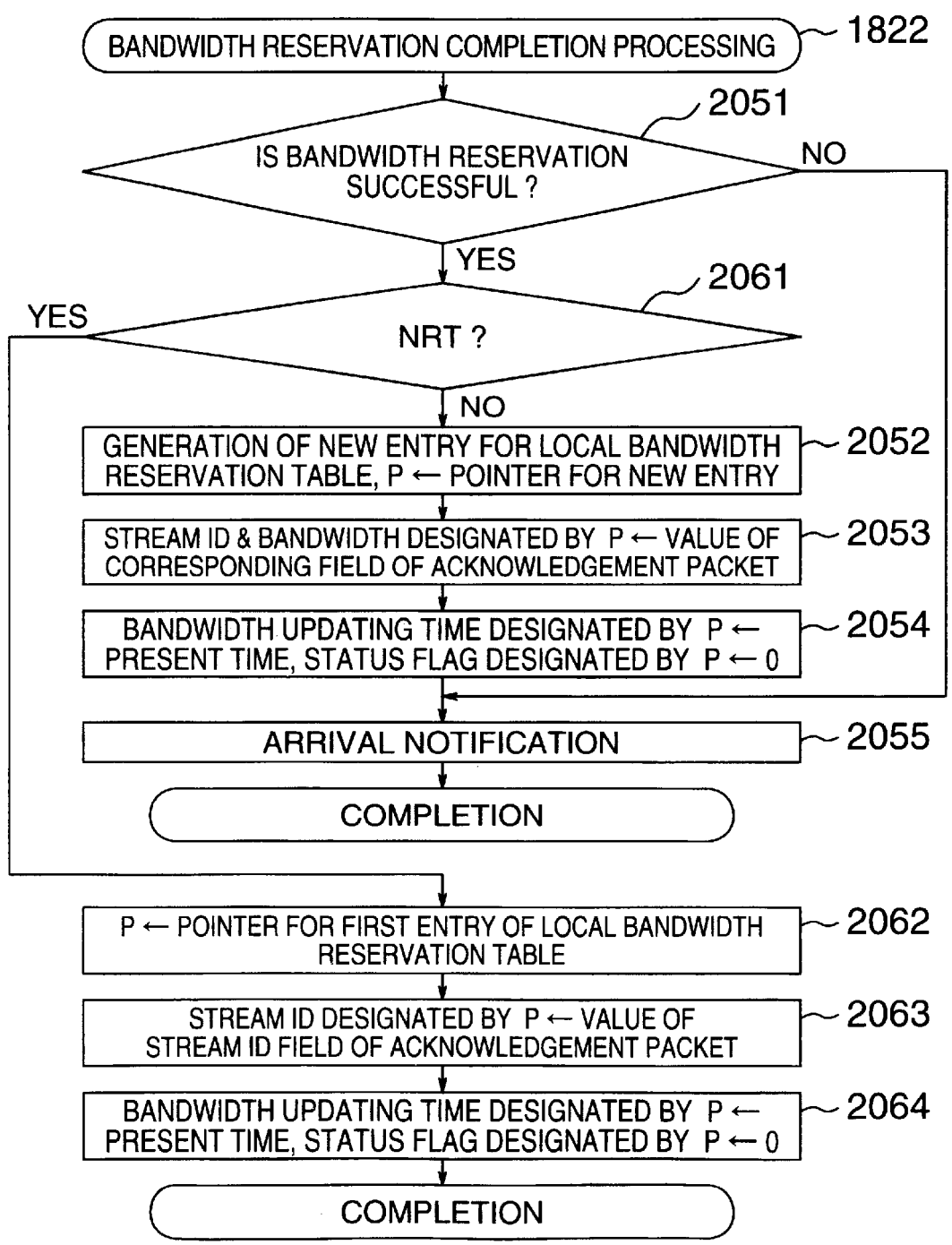
FIG. 20 shows the detail of a bandwidth reservation completion processing in the embodiment 2.

Whether or not the acknowledgement arrives from the global bandwidth reservation manager 901 is checked at the step 1812 and when it does, the flow proceeds to the step 1831 and when it does not, a series of processings are completed. At the step 1831, whether or not the value of the requester address field 3824 of the arriving acknowledgement packet 3801 coincides with the address of its own node is checked and when it does, the flow proceeds to the step 1813 and when it does not, the flow proceeds to the step 1817. Whether or not the value of the command field 3821 of the arriving acknowledgement packet 3801 coincides with the value representing the bandwidth reservation acknowledgement is checked, and when it dies, the flow proceeds to the step 1822 and when it does not, the flow proceeds to the step 1814. A series of processings depending on the result of the bandwidth reservation request shown in FIG. 20 are executed at the step 1182. At the step 1814, whether or not the value of the command field 3821 of the arriving acknowledgement packet 3801 coincides with the value representing the bandwidth release acknowledgement is checked, and when it does, the flow proceeds to the step 1823 and when it does not, the flow proceeds to the step 1815.

Figure 21:
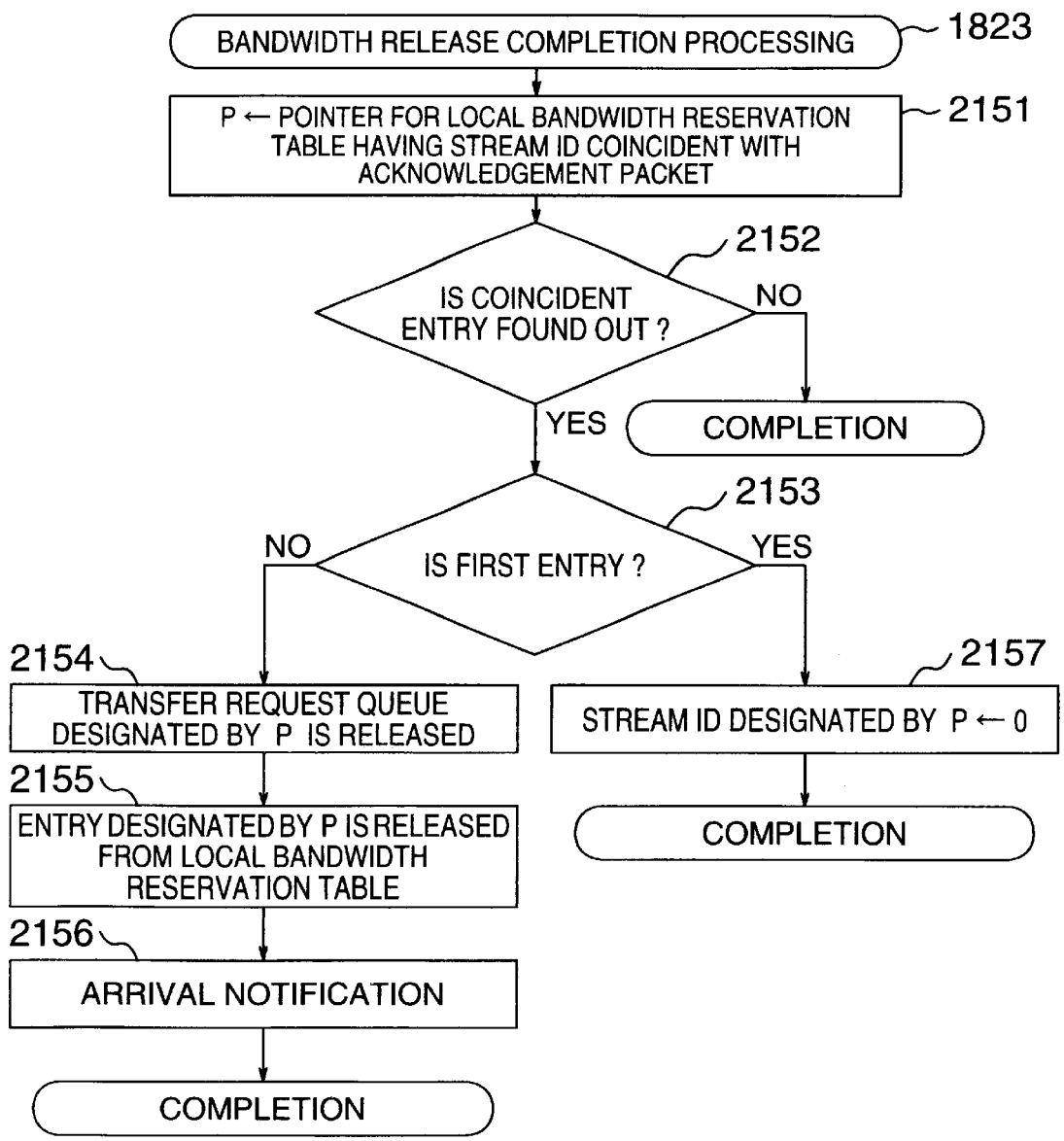
FIG. 21 shows the detail of a bandwidth release completion processing in the embodiment 2.
Figure 22:
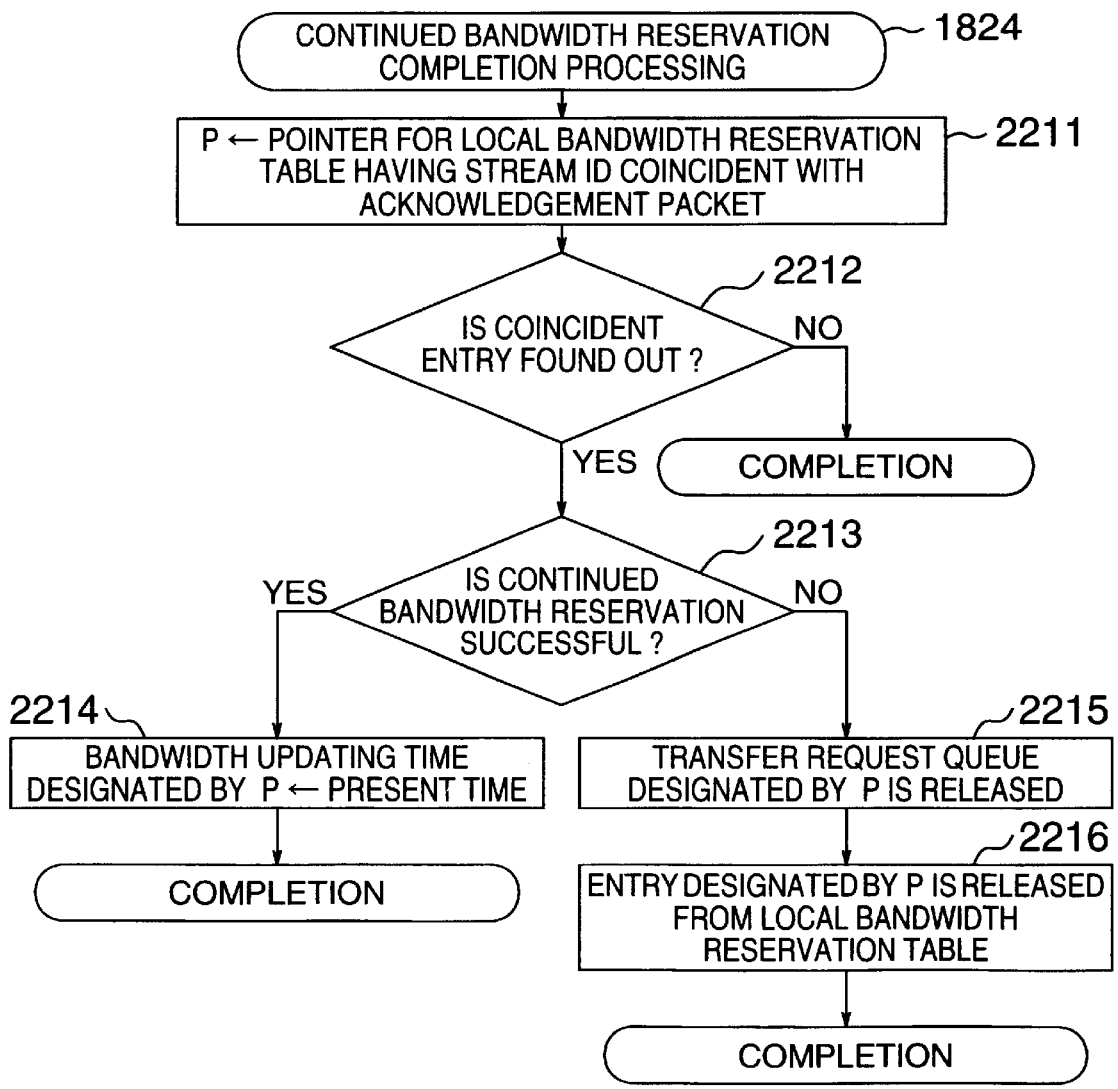
FIG. 22 shows the detail of a bandwidth consecutive reservation completion processing.
Figure 23:
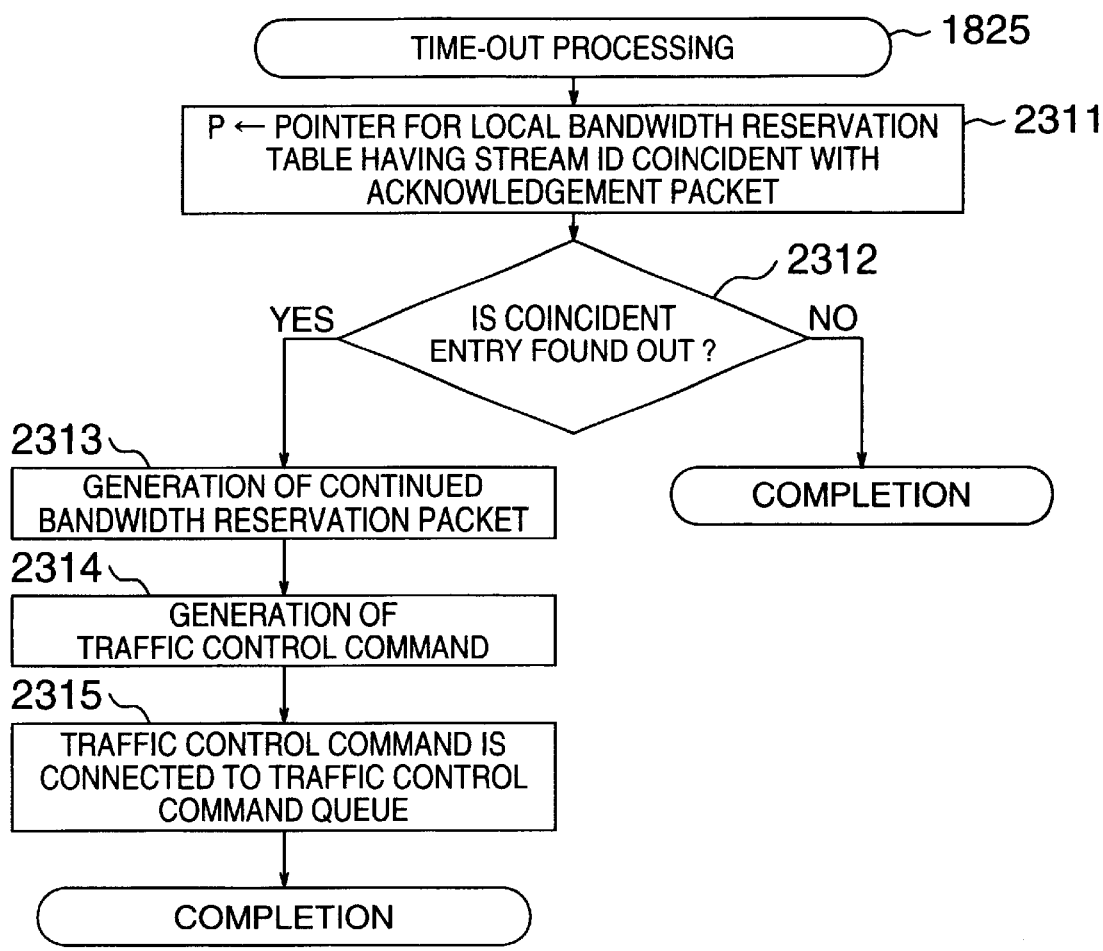
FIG. 23 shows the detail of a time-out processing in the embodiment 2.

At the step 1823, a series of processings depending on the result of the bandwidth release request shown in FIG. 21 are executed. At the step 1815, whether or not the value of the command field 3821 of the arriving acknowledgement packet 3801 coincides with the value representing the continued bandwidth reservation is checked and when it does, the flow proceeds to the step 1824 and when it does not, the flow proceeds to the step 1816. A series of processings depending on the result of the continued bandwidth reservation request shown in FIG. 22 are executed at the step 1824. Whether or not the value of the command field 3821 of the arriving acknowledgement packet 3801 coincides with the value representing the time-out pre-notification is checked at the step 1816 and when it does, the flow proceeds to the step 1825 and when it does not, the flow proceeds to the step 1817. At the step 1825, a series of processings by the time-out notification shown in FIG. 23 are executed. At the step 1817, whether the value of the stream ID 1201 of the first entry 1211 of the local bandwidth reservation table 1011 is 0 or 1 is checked and whether or not the NRT bandwidth is allocated is judged. When the NRT bandwidth is allocated, the flow proceeds to the step 1818 and when it is not, the flow proceeds to the step 1819. At the step 1818, the value of the NRT bandwidth field 3826 of the acknowledgement packet 3801 is set to the bandwidth field 1202 of the first entry 1211 of the local bandwidth reservation table 1011, and at the step 1819, on the other hand, the input/output buffer 312 allocated to the acknowledgement packet 3801 is released and the flow proceeds to the step 1812.

Figure 19:
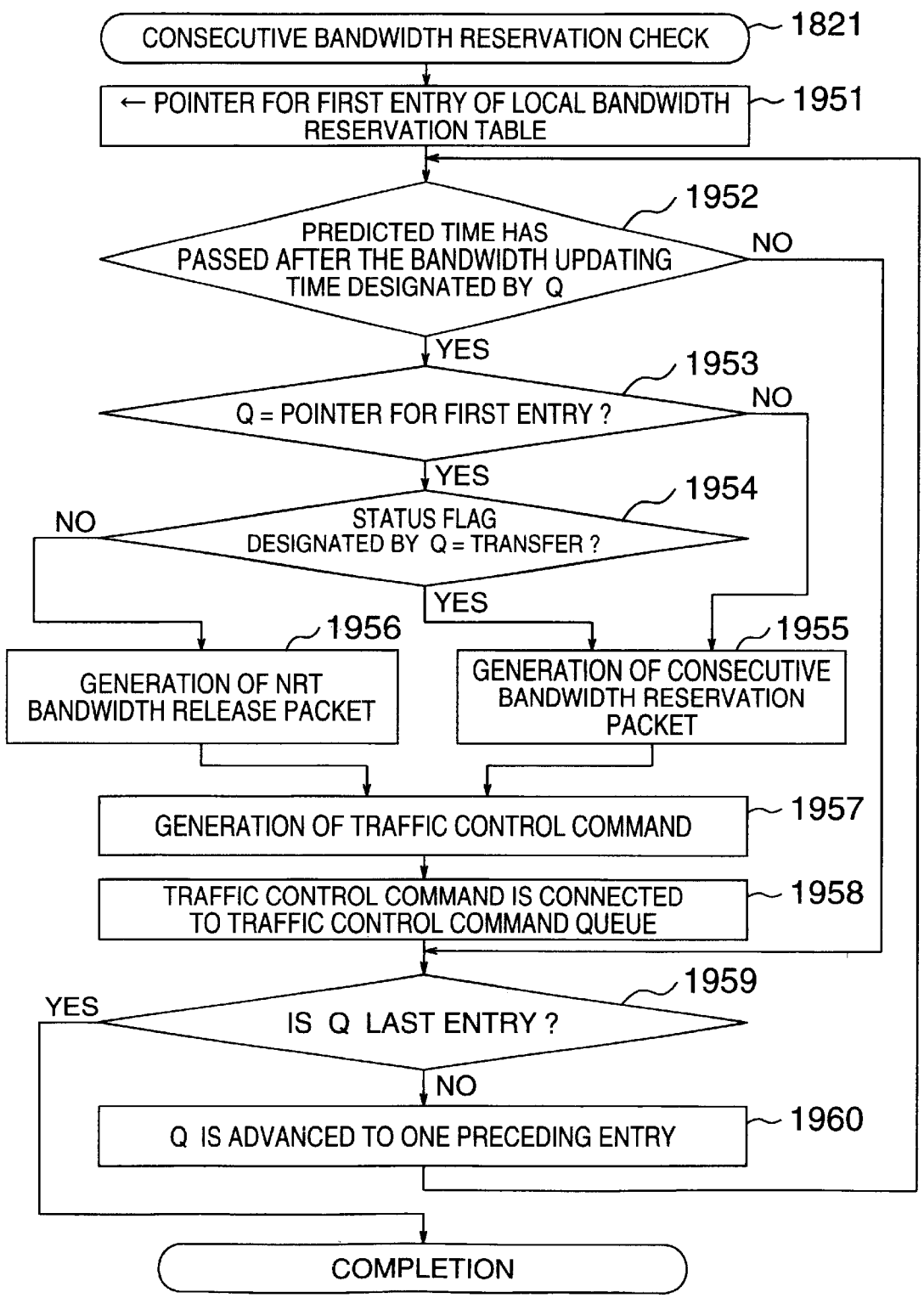
FIG. 19 shows the detail of a consecutive bandwidth reservation check processing in the embodiment 2.

FIG. 19 shows the detail of a consecutive bandwidth reservation check processing 1821. At the step 1951, the processor sets the pointer for the first entry 1211 of the local bandwidth reservation table 1011 to the local variable Q representing the pointer to the entries of this table 1011. At the step 1952, it is checked by the client by himself before the generation of the transfer packet whether or not the time inputted by the prediction of the client, such as 9 seconds, has passed after the time marked in the bandwidth updating time field 1203 of the entry designated by the local variable Q, and when it does, the flow proceeds to the step 1953 and when it does not, the flow proceeds to the step 1959. The time is put into this updating time field at the step 2054 or 2064 in FIG. and at step 2214 is FIG. 22 (as will be later explained). At the step 1953, whether or not the pointer designated by the local variable Q points the first entry 1211 of the local bandwidth reservation table 1011, that is, the entry of the NRT bandwidth, is checked, and when it does, the flow proceeds to the step 1954 and when it points the entries other than the NRT bandwidth, the flow proceeds to the step 1955. At the step 1954, whether or not the value of the status flag field 1204 of the entry designated by the local variable Q is the value representing that the transfer exists is checked, and when it is that value, the flow proceeds to the step 1955 and when it is not, the flow proceeds to the step 1956.

At the step 1955, the processor secures the input/output buffer 312 for the bandwidth continued reservation packet as the request packet 3701 for continued bandwidth reservation, and then sets the address of the bandwidth reservation manager 901 to the destination address field 3711 of the request packet 3701 so secured, he address of its own node to the source address field 712 and to the requester address field 3724, the value representing the request packet to the type field 3713, the value representing the continued bandwidth reservation to the command field 3712, the value of the stream ID field 1201 designated by the local variable P to the stream ID field, the value of the bandwidth field 1202 designated by the local variable P to the bandwidth field 3723, and a primary value to the request ID field 3725.

At the step 1956, the processor secures the input/output buffer 312 for the bandwidth release packet as the request packet 3701 for the bandwidth release, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3721, the value of the stream ID field 1201 designated by the local variable P to the stream ID field, the value of the bandwidth field 1202 designated by the local variable P to the bandwidth field 3723 and a primary value to the request ID field 3725.

At the step 1957, the processor secures the transfer request packet 402 for the bandwidth release packet or for the traffic control command requesting the transfer of the continued bandwidth reservation packet 3701, and then sets the address of the band release packet of the continued bandwidth reservation packet 3701 to the pointer field 412 for the buffer of the transfer request command 402 so secured, and the data length of the band release packet or the continued bandwidth reservation packet 3701 to the transfer data length field 413. At the step 1958, the transfer request command 402 secured at the step 1957 is connected to the traffic control command queue 1008. At the next step 1959, whether or not the entry designated by the local variable Q is the final entry is checked, and when it is, a series of processings are completed and when it is not, the flow proceeds to the step 1960. At this step 1960, the pointer for the next entry designated by the local variable Q is set to the local variable Q.

FIG. 20 shows the detail of the bandwidth reservation completion processing 1822. At the step 2051, the processor checks whether or not the value of the stream ID field 3821 of the acknowledgement packet 3801 is 0, and when it is other than 0, the flow proceeds to the step 2061 and when it is 0, the flow proceeds to the step 2055. At the step 2061, whether or not the value of the bandwidth field 3823 of the acknowledgement packet 3801 is 0 is checked, and when it is other than 0, the flow proceeds to the step 2052 and when it is 0, the flow proceeds to the step 2062. At the step 2052, a new entry 1215 is generated afresh for the local bandwidth reservation table 1011 and the pointer for this entry 1215 is set to the local variable P designating the entries of the local bandwidth reservation table 1011. At the step 2053, the value of the stream ID 3822 of the acknowledgement packet 3801 Is set to the stream ID field 1201 designated by the local variable P, and the value of the bandwidth field 3823 of the acknowledgement packet 3801 is set to the bandwidth field 1202 designated by the local variable P.

At the step 2054, the present time is set to the bandwidth updating time field 1203 designated by the local variable P and the status flag 1204 designated by the local variable P is initiated to 0. At the step 2055 the arrival notification is given to the bandwidth reservation module 1005 waiting for the arrival of the acknowledgement packet 3801 having the value of the request ID field 3825, which coincides with the value set to the request ID field 3725 of the bandwidth reservation packet 3701, and a series of processings are completed. At the step 2062, the pointer for the first entry 1211 of the local bandwidth reservation table 1011 is set to the local variable P designating the pointer to the entries of this table 1011. At the step 2063, the value of the stream ID 3822 of the acknowledgement packet 3801 is set to the stream ID field 1201 designated by the local variable P, and the value of the NRT bandwidth field 3826 of the acknowledgement packet 3801 is set to the bandwidth field 1202 designated by the local variable P. At the step 2064, the present time is set to the bandwidth updating time field 1203 designated by the local variable P, the status flag 1204 designated by the local variable P is initialized to 0 and a series of processings are completed.

FIG. 21 shows the detail of the bandwidth release completion processing 1823. At the step 2151, the processor sets the pointer for the entry of the local bandwidth reservation table 1011 in which the stream ID 1201 of this table 1011 coincides with the stream ID field 3822 of the acknowledgement packet 3801 is set to the local variable P designating the pointer for the entries of the local bandwidth reservation table 1011. Whether or not the entry of the local bandwidth reservation table 1011 in which the stream ID 1201 of the table 1011 coincides with the stream ID field 3822 of the acknowledgement packet 3801 exists is checked at the step 2151, and when it does, the flow proceeds to the step 2153 and when it does not, a series of processings are completed at the step 2152. At the next step 2153, whether or not the entry designated by the local variable P coincides with the first entry 1211 of the local bandwidth reservation table 1011 as the NRT bandwidth is checked, and when it does, the flow proceeds to the step 2157 and when it does not, the flow proceeds to the step 2154. At the step 2154, the transfer request command 402 of the transfer request queue 401 designated by the local variable P is released. The entry designated by the local variable P is released at the step 2155. At the step 2156, the arrival notification given to the bandwidth release module 1006 that waits for the arrival of the acknowledgement packet 3801 having the value of the request ID field 3825, which is coincident with the value set to the request ID field 3725 of the bandwidth release packet 3701, and a series of processings are completed. At the step 2157, 0 is set to the stream ID 1201 designated by the local variable P, and a series of processings are completed.

FIG. 22 shows the detail of the continued bandwidth reservation completion processing 1824. At the step 2211, the processor sets the pointer for the entry of the local bandwidth reservation table 1011 in which the stream ID 1201 of the local bandwidth reservation table 1011 coincides with the stream ID field 3822 of the acknowledgement packet 3801 to the local variable P designating the pointer for the entries of this table 1011. Whether or not the entry of the local bandwidth reservation table 1011 in which the stream ID 1201 of the table 1011 coincides with the stream ID field 3822 of the acknowledgement packet 3801 exists is checked at the step 2211, and when it does, the flow proceeds to the step 2213 and when it does not, a series of processings are completed at the step 2211. At the step 2213, whether or not the value of the bandwidth field 3823 of the acknowledgement packet 3801 coincides with the value of the bandwidth field 1202 designated by the local variable P is checked, and when it does, the flow proceeds to the step 2214 and when it does not, the flow proceeds to the step 2215. At the step 2214, the present time is set to the bandwidth updating time field 1203 and a series of processings are completed. At the step 2215, the transfer request command 402 of the transfer request queue 401 designated by the local variable P is released. The entry designated by the local variable P is released and a series of processings are completed at the step 2216.

FIG. 23 shows the detail of the time-out processing. At the step 2311, the processor sets the pointer for the entry of the local bandwidth reservation table 1011 in which the stream ID 1201 of this table 1011 coincides with the stream ID field 3822 of the acknowledgement packet 3801 to the local variable P designating the pointer for the entries of the table 1011. At the step 2211, whether or not the entry of the local bandwidth reservation table 1011 in which the stream ID 1201 of this table 1011 coincides with the stream ID field 3822 of the acknowledgement packet 3801 exists is checked, and when it does, the flow proceeds to the step 2313 and when it does not, a series of processings are completed.

At the step 2313, the processor secures the input/output buffer 312 for the continued bandwidth reservation packet as the request packet 3801 for the continued bandwidth reservation, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the continued bandwidth reservation to the command field 3721, the value of the stream ID field 1201 designated by the local variable P to the stream ID field, the value of the bandwidth field 1202 designated by the local variable P to the bandwidth field 3723 and a primary value to the request ID field 3725. At the step 2314, the processor secures the transfer request command 402 for the traffic control command requesting the transfer of the continued bandwidth reservation packet 3701, and then sets the address of the bandwidth release packet or the continued bandwidth reservation packet 3701 to the pointer field 412 for the buffer of the transfer request command 402 so secured, and the data length of the bandwidth release packet of the continued bandwidth reservation packet 3701 to the transfer data length field 413. At the step 2315, the transfer request command 402 secured at the step 2314 is connected to the traffic control command queue 1008 and a series of processings are completed.

In the explanation given above, the address of the bandwidth reservation manager 901 is assumed to be known is advance, but it is easily possible to apply a method which uses broadcast for this address, a method which uses the address detected at the activation of a local bandwidth reservation management 101 or the address detected periodically, by using means for detecting the address of the bandwidth reservation manager 901, or a method which uses a specific address using the address of the bandwidth reservation manager 901.

Next, the principal data structures shown in FIG. 11 will be explained with reference to FIGS. 24 to 26.

Figures 24, 25, 26:
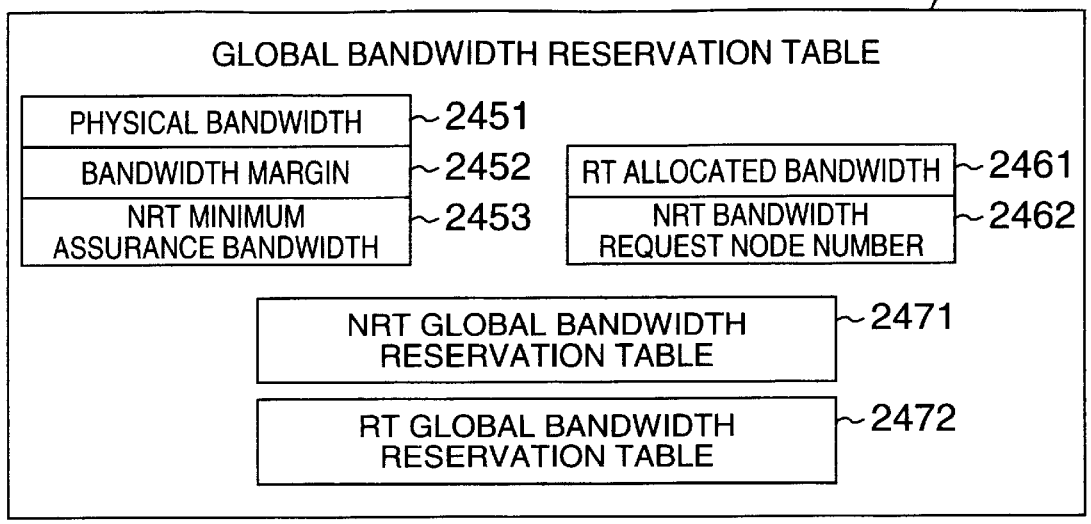
FIG. 24 shows the structure of a global bandwidth reservation table in the embodiment 2.
FIG. 25 shows the structure of an NRT global bandwidth reservation table in the embodiment 2.
FIG. 26 shows the structure of an RT global bandwidth reservation table in the embodiment 2.

FIG. 24 shows the structure of the global bandwidth reservation table 1111. The value representing the total of the data quantity that can be transferred by the network 111 per unit time is stored in the physical bandwidth 2451. The data quantity that is secured as a margin per unit time is secured in the bandwidth margin 2452. The lower limit value of the quantity of the data allocated to the NRT transfer that can be transferred per unit time is set to the NRT minimum assurance bandwidth 2453. The quantity of the data allocated to the RT transfer that can be transferred per unit time is stored in the RT allocated bandwidth 2461. The number of nodes allocating the data quantity for the NRT transfer that can be transferred per unit time is stored in the NRT request node number 2462. The detailed data for each node to which the data quantity, that can be transferred per unit time for the NRT communication and is allocated to the NRT transfer, is stored in the NRT global bandwidth reservation table 2471 as will be described in detail with reference to FIG. 25. Further, the detailed data for each node to which the data quantity transferrable per unit time for the RT communication is stored in the RT global bandwidth reservation table 2472 as will be described in detail with reference to FIG. 26.

FIG. 25 shows the structure of the NRT global bandwidth reservation table 2471. The NRT global bandwidth reservation table 2471 includes the entries 2521 to 2525 for the nodes to which the bandwidth are allocated for the NRT communication. Each entry comprises a stream ID field 2511 representing an identifier of the stream, a requester address field 2512 for storing the address of the node to which the bandwidth is allocated, an acceptance time field 2513 for storing the bandwidth allocation time and the acceptance time of the bandwidth continuation, a status flag field 2514 representing the status of each entry and a request ID field 2515 for primarily recognizing the request when the bandwidth is allocated.

FIG. 26 shows the structure of the RT global bandwidth reservation table 2472. The RT global bandwidth reservation table 2472 includes entries 2621 to 2625 for the streams to which the bandwidth is allocated for the RT communication. Each entry comprises a stream ID field 2611 representing an identifier of the stream, a requester address field 2612 for storing the address of the node to which the bandwidth is allocated, an acceptance time field 2613 for storing the bandwidth allocation time and the acceptance time of the bandwidth continuation, a status flag field 2614 representing the status of each entry, a request ID field 2615 for recognizing primarily the requests when the bandwidth is allocated, and an allocated bandwidth field 2616 for storing the allocated bandwidth.

Next, each of the modules shown in FIG. 11 will be explained with reference to FIGS. 27 to 36.

Figure 27:
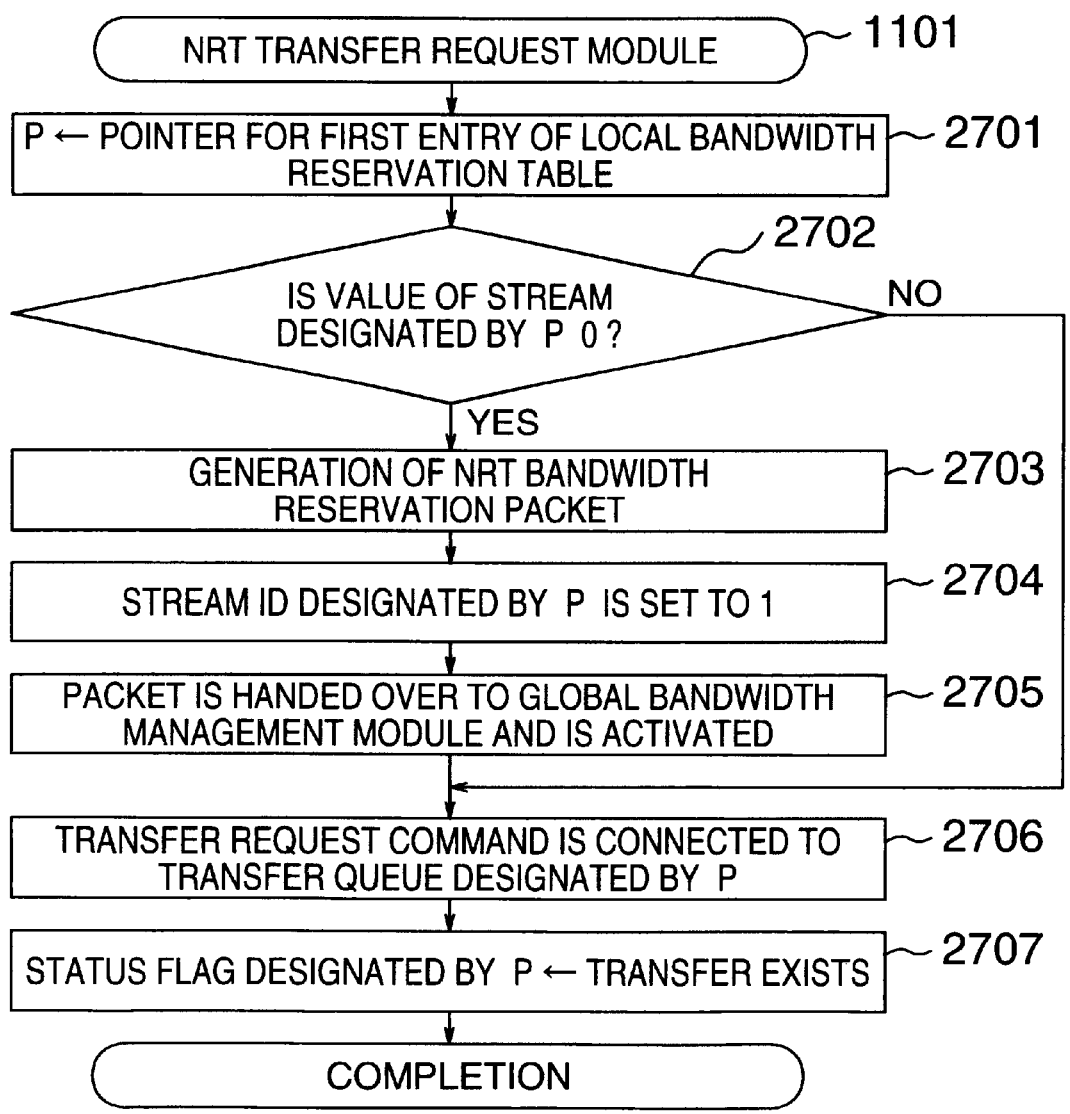
FIG. 27 is a flowchart of an NRT transfer request module of a bandwidth reservation management node in the embodiment 2.

FIG. 27 shows a processing flow of the NRT transfer request module 1101. At the step 2701, the processor sets the pointer for the first entry 1211 of the local bandwidth reservation table 1011 to the local variable P representing the entries of the local bandwidth reservation table 1011. At the step 2702, the value of the stream ID designated by the local variable P is checked. When it is 0, the flow proceeds to the step 2703 so as to secure the NRT bandwidth and when it is not, the flow proceeds to the step 2706. At the step 2703, the processor secures the input/output buffer 312 for the bandwidth reservation packet as the request packet 3701 for reserving the bandwidth, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, 0 to the bandwidth field 3723 and a primary value to the request ID field 3725.

At the step 2704, 1 is set to the stream ID designated by the local variable P while 0 is set to the bandwidth designated by the local variable P lest the bandwidth reservation occurs in multiplicity and the bandwidth is used before the bandwidth reservation is confirmed. At the step 2705, the bandwidth reservation packet 3701 secured at the step 2703 is handed over to the global bandwidth reservation management module 1102 and this module 1102 is activated. At the step 2706, the transfer request command 402 designated by the user program is connected to the transfer request queue 402 of the entry designated by the local variable P. After the value representing that the transfer exists is set to the status flag field 1204 designated by the local variable P, a series of processings are completed at the step 2707.

Figure 28:
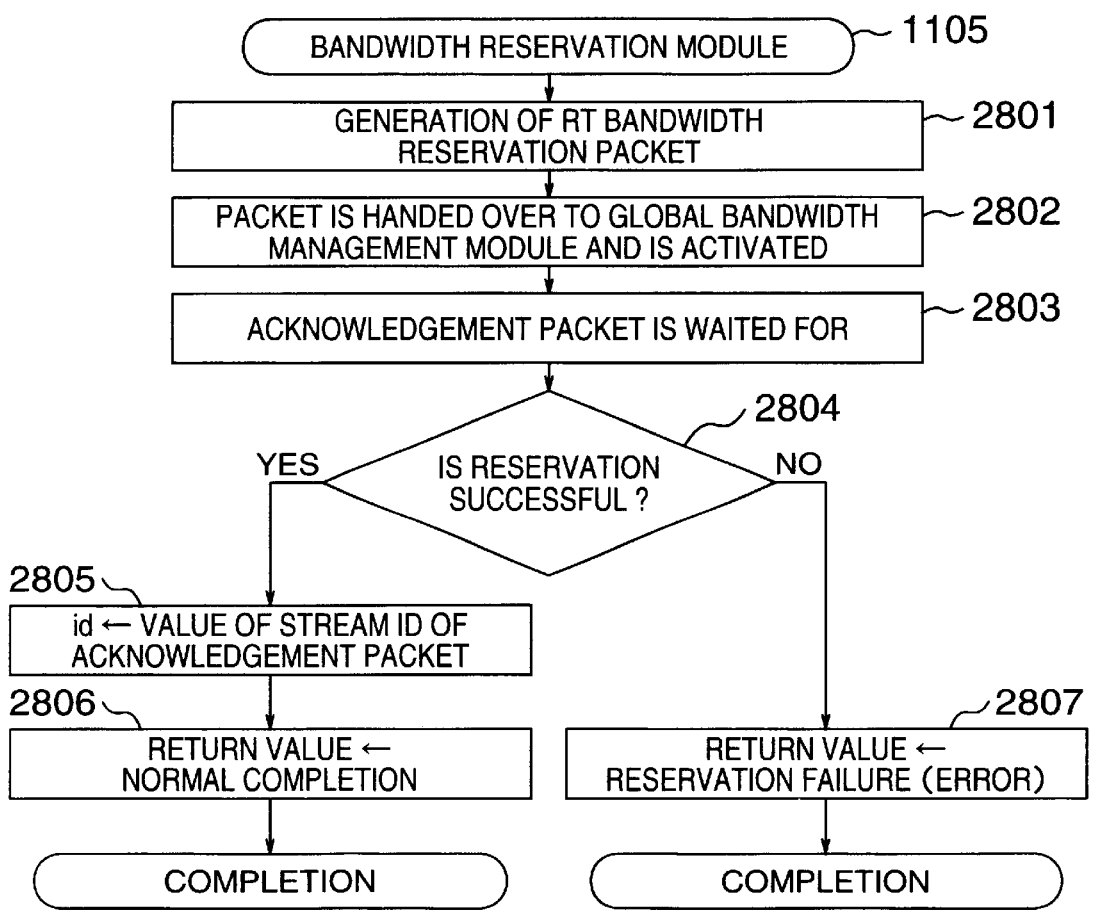
FIG. 28 is a flowchart of a bandwidth reservation module of a bandwidth reservation management node in the embodiment 2.

FIG. 28 shows a processing flow of the bandwidth reservation module 1105. At the step 2801, the processor secures the input/output buffer 312 for the bandwidth reservation packet as the request packet 3701 for reserving the bandwidth and then sets the address of the local bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, the value designated by the argument bw to the bandwidth field 3723 and a primary value to the request ID field 3725. At the step 2802, the bandwidth reservation packet 3701 secured at the step 3801 is handed over to the global bandwidth reservation management module 1102 and this module 1102 is activated. At the step 2803, the arrival notification of the acknowledgement packet 3801, in which the request ID field 3725 of the bandwidth reservation packet coincides with the request ID field 3825 of the acknowledgement packet 380-1, is awaited from the local bandwidth reservation management module 1007. When the value of the bandwidth field 3823 of the acknowledgement packet 3801 receiving the arrival notification coincides with the value designated by the argument bw, the flow proceeds to the step 2805 and when it does not, the flow proceeds to the step 2807. At the step 2805, the value of the identifier field 3822 of the acknowledgement packet 3801 is set to the area designated by the argument id. At the step 2806, the value representing normal completion is set as the return value and a series of processings are completed. At the step 2807, the value representing the failure of the bandwidth reservation is set as the return value and a series of processings are completed.

Figure 29:
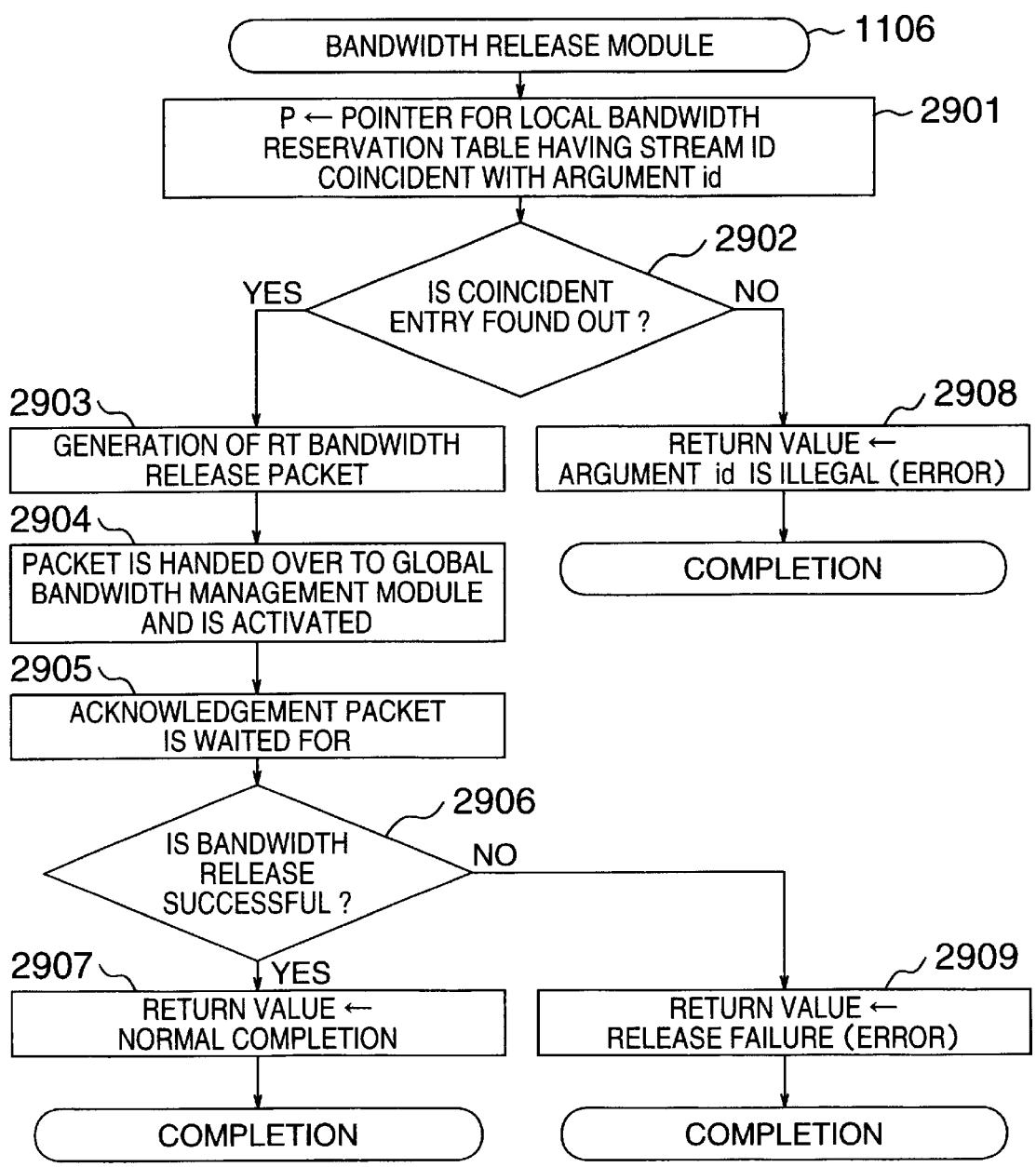
FIG. 29 is a flowchart of a bandwidth release module of a bandwidth reservation management node in the embodiment 2.

FIG. 29 shows a processing flow of the bandwidth release module 1106. At the step 2901, the processor sets the pointer for the entries of the local bandwidth reservation table 1011 having the argument id which coincides with the stream ID 1201 of this table 1011 to the local variable P representing the pointer to the entries of the table 1011. At the step 2902, whether or not the entry of the local bandwidth reservation table 1011 having the argument id which coincides with the stream ID 1201 of this table 1011 exists is checked, and when it does, the flow proceeds to the step 2903 and when it does not, the flow proceeds to the step 2908. At the step 2903, the processor secures the input/output buffer 312 for the bandwidth release packet as the request packet 3701 for releasing the bandwidth, and sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3712, the value of the stream ID field 1201 designated by the local variable P to the stream ID, the value of the bandwidth field 1202 designated by the local variable P to the bandwidth field 3723 and a primary value to the request ID field 3725.

At the step 2904, the processor hands over the bandwidth release packet 3701 secured at the step 2903 to the global bandwidth reservation management module 1102 and activates this module 1102. At the step 2905, the processor waits for the arrival notification of the acknowledgement packet 3801 in which the request ID field 3725 of the bandwidth release packet 3701 coincides with the request ID field 3825 of the bandwidth release packet 3701, from the local bandwidth reservation management module 1007. At the step 2906, whether or not the value of the bandwidth field 3823 of the acknowledgement packet 3801 receiving the arrival notification is 0 is checked, and when it is other than 0, the flow proceeds to the step 2907 and when it is 0, the flow proceeds to the step 2909. At the step 2907, the value representing normal completion is set as the return value and a series of processings are completed. At the step 2909, on the other hand, the value representing the failure of the bandwidth reservation is set as the return value and a series of processings are completed. Further, the value representing that the argument id is illegal is set as the return value and a series of processings are completed at the step 2908.

Figure 30:
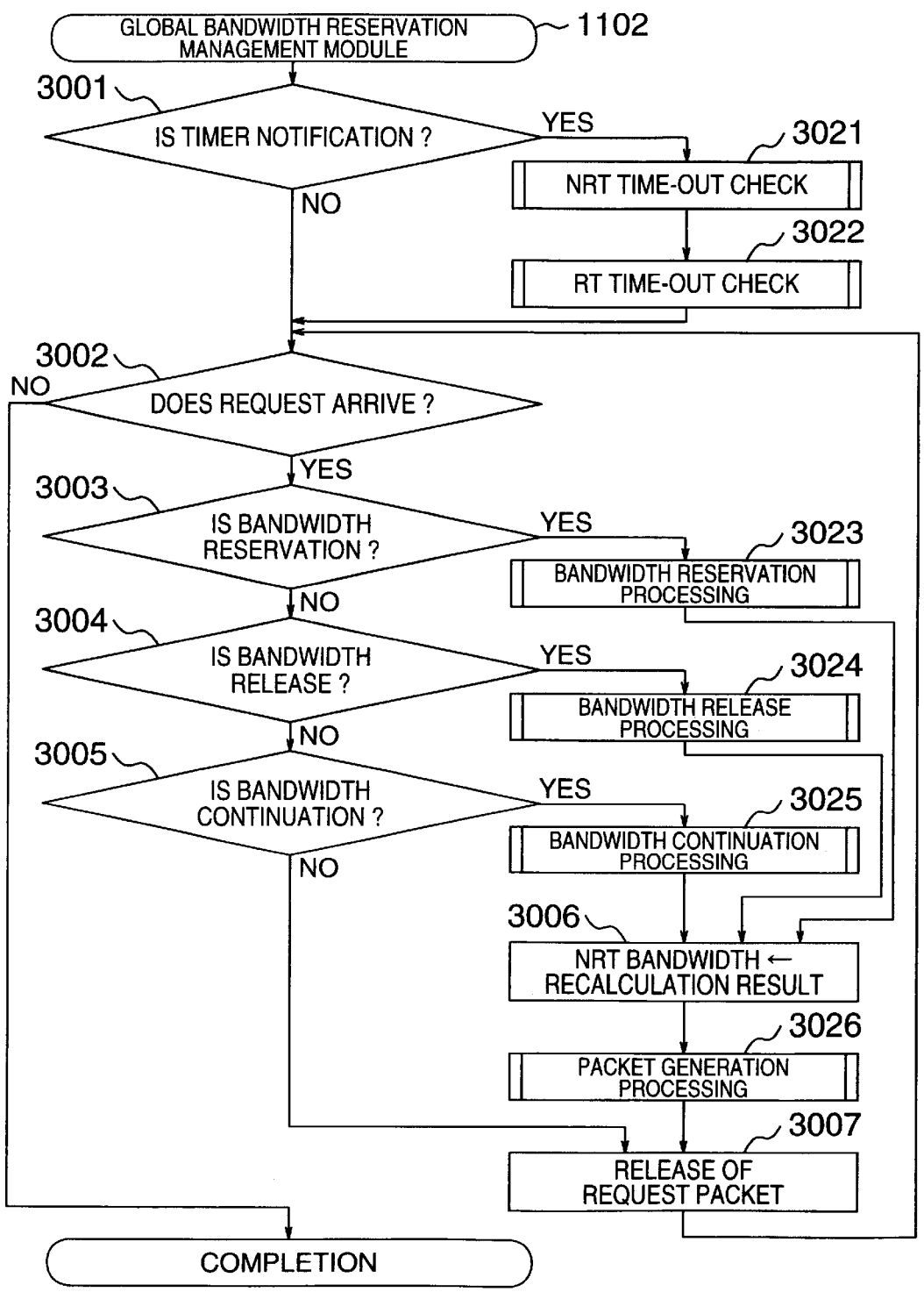
FIG. 30 is a flowchart of a global bandwidth reservation management module in the embodiment 2.

FIG. 30 shows a processing flow of the global bandwidth reservation management module 1102. This module 1102 is activated in the interval set to the timer interrupt handler 303 such as 40 msec, for example, through the scheduler 304. The global bandwidth reservation management module 1102 is also activated by the input/output interrupt handler 1104 through the scheduler 304 whenever the packet to be processed by this module 1102 arrives. At the step 3001, whether or not the call of the module originates from the timer interrupt is judged, and when it does, the flow proceeds to the step 3021 and when it does not, the flow proceeds to the step 3002. At the step 3021, a series of processings due to time-out of the NRT bandwidth are executed. At the step 3002, whether or not the request packet 3701 arrives is checked, and when it does, the flow proceeds to the step 3003 and when it does not, a series of processings are completed.

Figure 33:
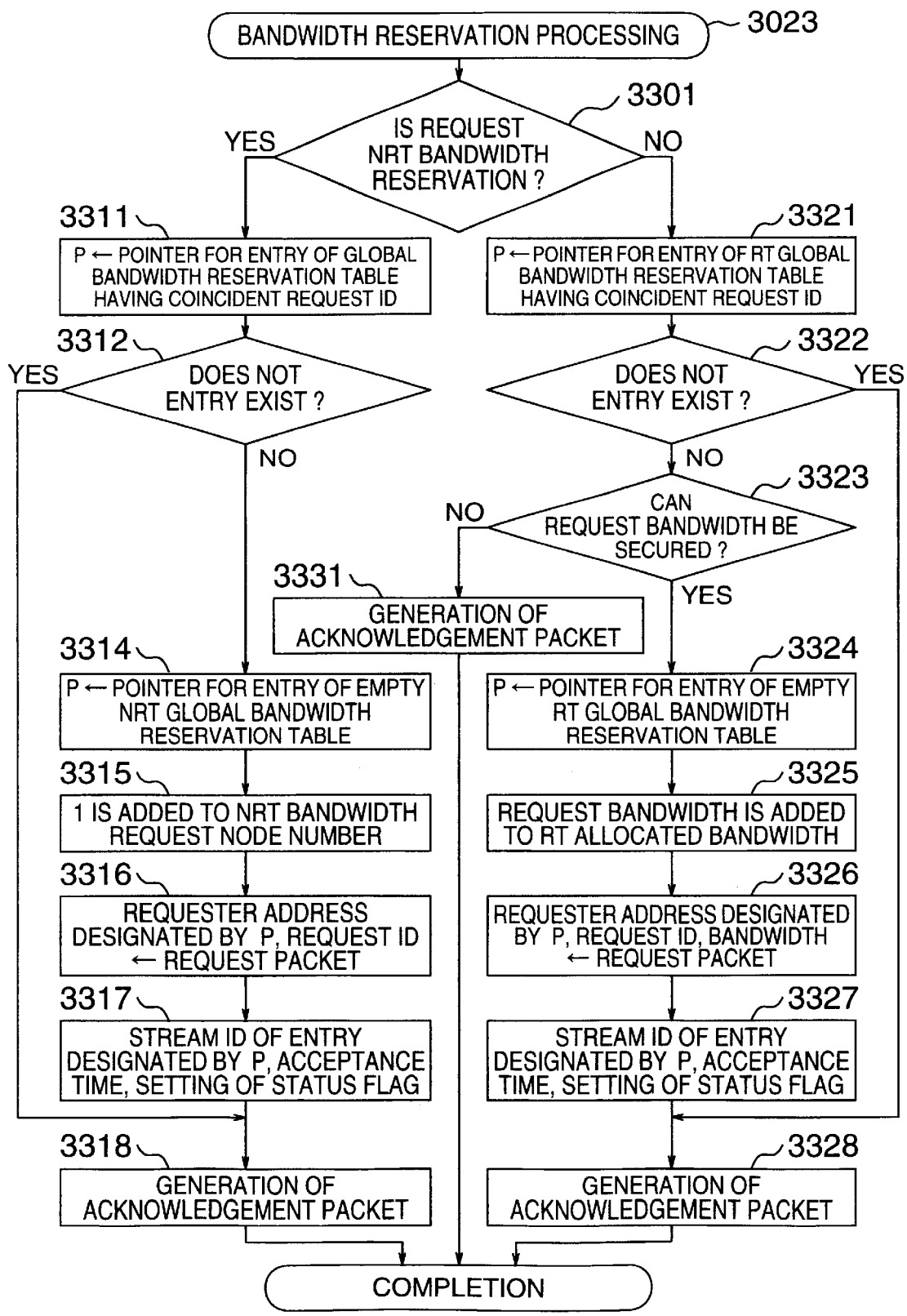
FIG. 33 is a flowchart of a bandwidth reservation processing in the embodiment 2.
Figure 34:
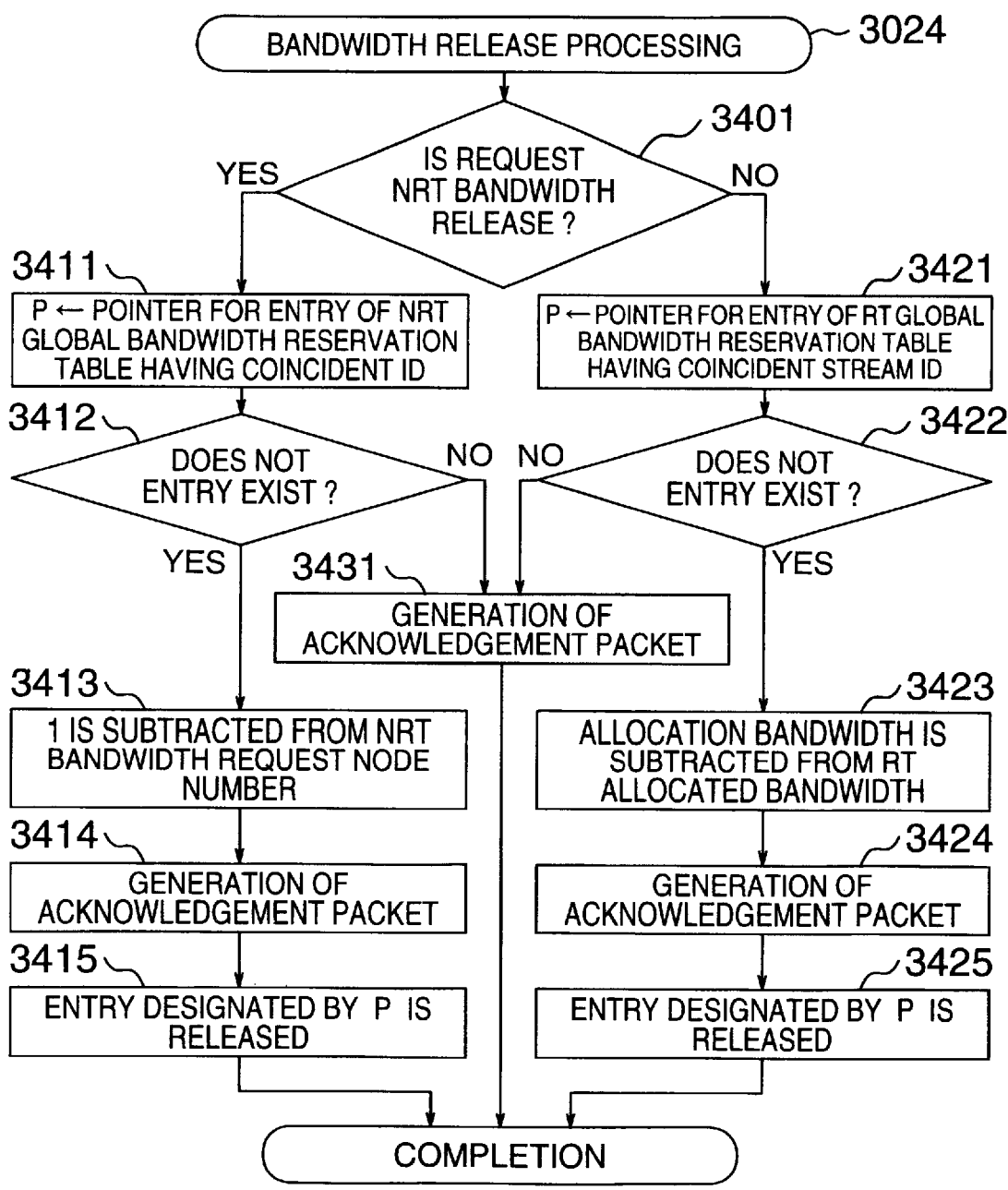
FIG. 34 is a flowchart of a bandwidth release processing in the embodiment 2.
Figure 35:
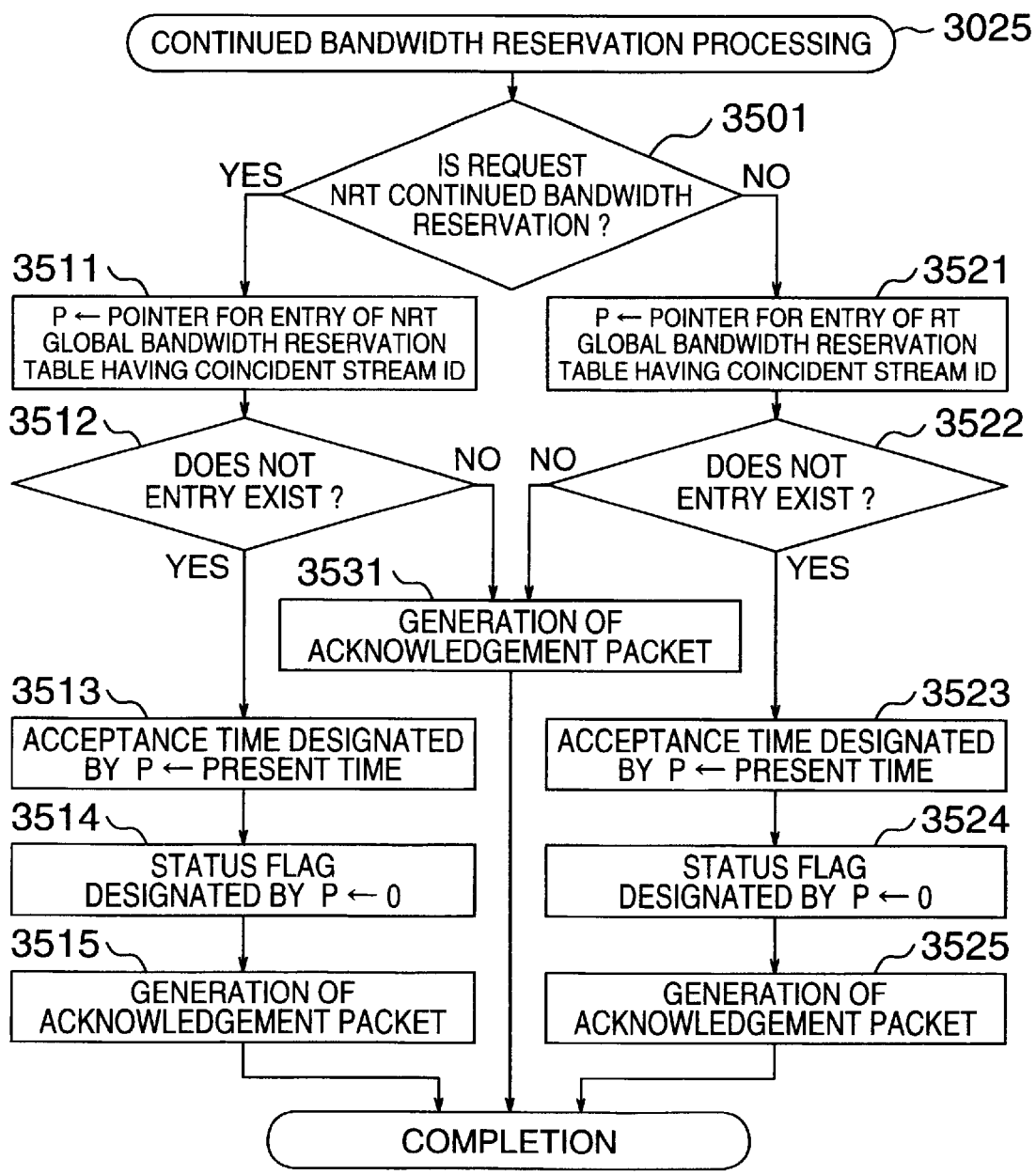
FIG. 35 is a flowchart of a bandwidth consecutive reservation processing in the embodiment 2.
Figure 36:
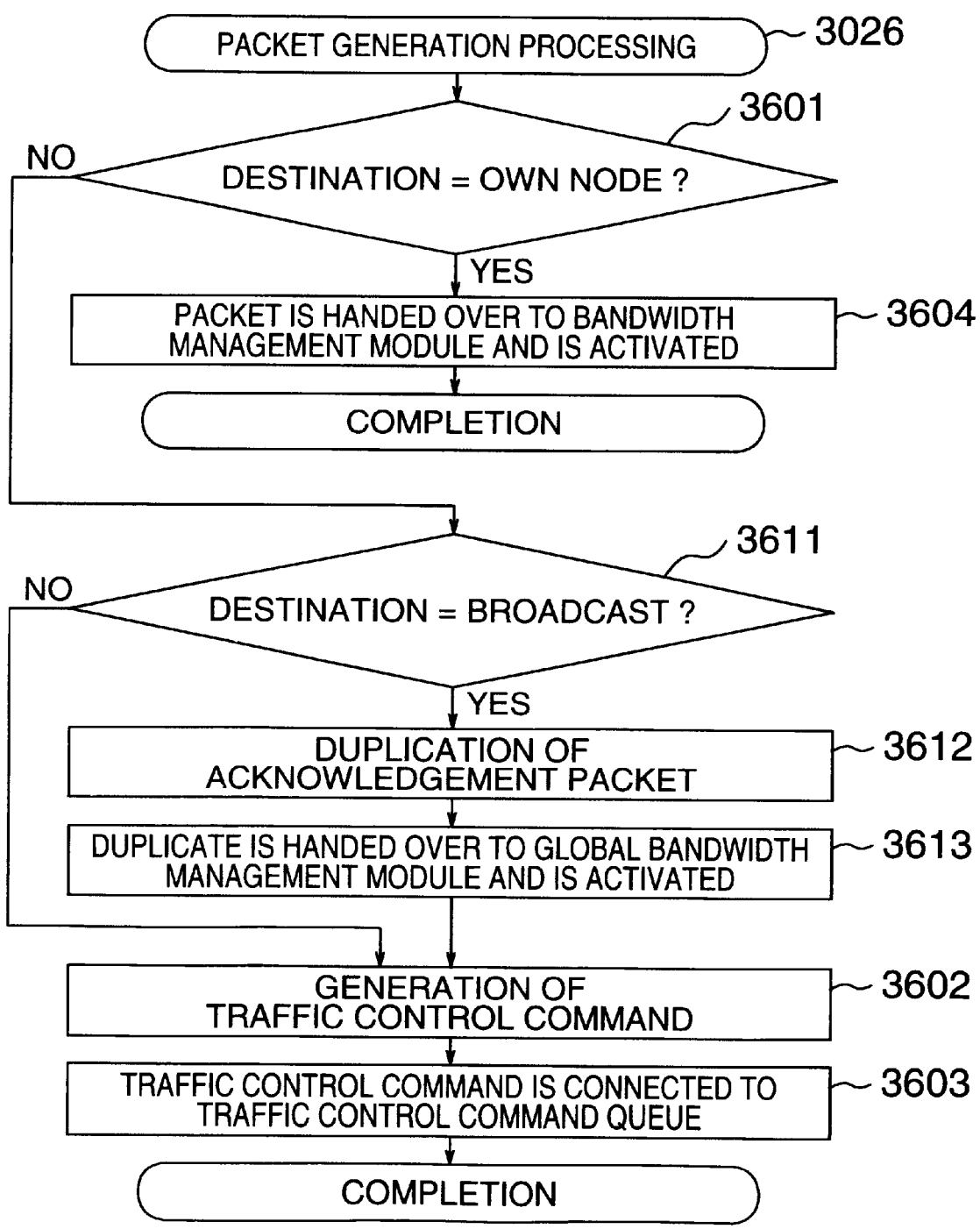
FIG. 36 is a flowchart of a packet generation processing in the embodiment 2.

At the step 3003, whether or not the value of the command field 3721 of the arriving request packet 3701 coincides with the value representing the bandwidth reservation is checked, and when it does, the flow proceeds to the step 3023 and when it does not, the flow proceeds to the step 3004. At the step 3023, a series of processings by the bandwidth reservation request shown in FIG. 33 are executed. At the step 3004, whether or not the value of the command field 3721 of the arriving request packet 3701 coincides with the value representing the bandwidth release is checked, and when it does, the flow proceeds to the step 3024 and when it does not, the flow proceeds to the step 3005. Next, a series of processings due to the bandwidth release request shown in FIG. 34 are executed at the step 3023. At the step 3005, whether or not the value of the command field 3721 of the arriving request packet 3701 coincides with the value representing the continued bandwidth reservation is checked, and when it does, the flow proceeds to the step 3025 and when it does not, the flow proceeds to the step 3007. At the step 3023, a series of processings due to the continued bandwidth reservation request shown in FIG. 35 are executed. At the step 3006, the value obtained by subtracting the bandwidth margin 2452 from the physical bandwidth 2451, the subtracting the RT allocated bandwidth 2461 from the balance and dividing further the balance so obtained by the NRT bandwidth request node number 2462 is set to the NRT bandwidth field 3826 of the acknowledgement packet 3801. At the step 3026, a series of processings for generating the packet shown in FIG. 36 are executed. At the step 3007, the input/output buffer 312 allocated to the request packet 3701 is released and the flow then proceeds to the step 3002.

Figure 31:
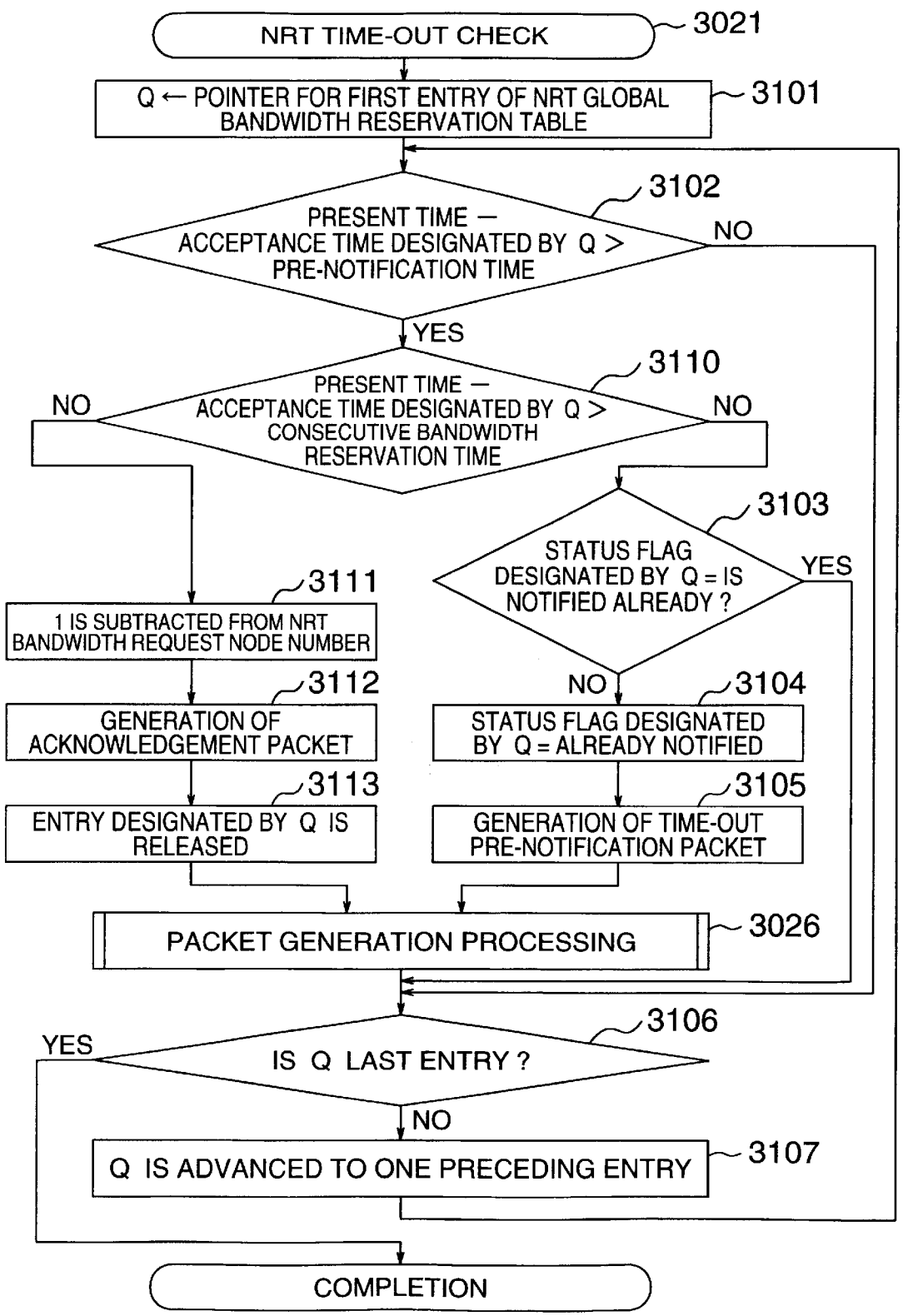
FIG. 31 is a flowchart of an NRT time-out check in the embodiment 2.

FIG. 31 shows a processing flow of the NRT time-out check 3021. At the step 3101, the processor sets the pointer for the first entry 2521 of the NRT global bandwidth reservation table 2471 to the local variable Q representing the pointer to the entries of this table 2471. At the step 3102, whether or not the difference of the value of the acceptance time field 2513 designated by the local variable Q from the present time exceeds the pre-notification time such as 10 seconds is checked, and when it does, the flow proceeds to the step 3110 and when it does not, the flow proceeds to the step 3106. At the step 3110, whether or not the difference of the value of the acceptance time field 2513 designated by the local variable Q from the present time exceeds the consecutive bandwidth reservation time such as 12 seconds is checked, and when it does, the flow proceeds to the step 3111 and when it does not, the flow proceeds to the step 3103. At the step 3111, the balance obtained by subtracting 1 from the value of the NRT bandwidth request node number 2462 is set to the NRT bandwidth request node number 2462.

At the step 3112, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth release acknowledgement to the command field 3821, the value of the stream ID field 2511 designated by the local variable Q to the stream ID field 3822, 0 to the bandwidth field 3823, the value of the requester address field 2512 designated by the local variable Q to the requester address field 3824 and 0 to the request ID field 3825. The entry designated by the local variable Q is released at the step 3113. At the step 3103, whether or not the value of the status flag 2514 designated by the local variable Q coincides with the value that has been notified is checked, and when it does, the flow proceeds to the step 3106 and when it does not, the flow proceeds to the step 3104. At the step 3104, the value representing completion of the notification is set to the status flag 2514 designated by the local variable Q.

At the step 3105, the processor secures the input/output butter 312 for the acknowledgement packet 3801, and sets the value of the requester address field 2512 designated by the local variable Q to the destination address field 3811 of the acknowledgement packet 3801 so secured and to the requester address field 3824, the address of its own node to the source address field 3812, the value representing the acknowledgement packet to the type field 3813, the value representing the time-out pre-notification to the command field 3821, the value of the stream ID field 2511 designated by the local variable Q to the stream ID field 3822, 0 to the bandwidth field 3823, and 0 to the request ID field 3825. At the step 3026, a series of processings shown in FIG. 36 are executed. At the step 3106, whether or not the entry designated by the local variable Q is the last entry is checked and when it is, a series of processings are completed and when it is not, the flow proceeds to the step 3107. At the step 3107, the local variable Q is set to the pointer for the next entry and the flow proceeds to the step 3102.

Figure 32:
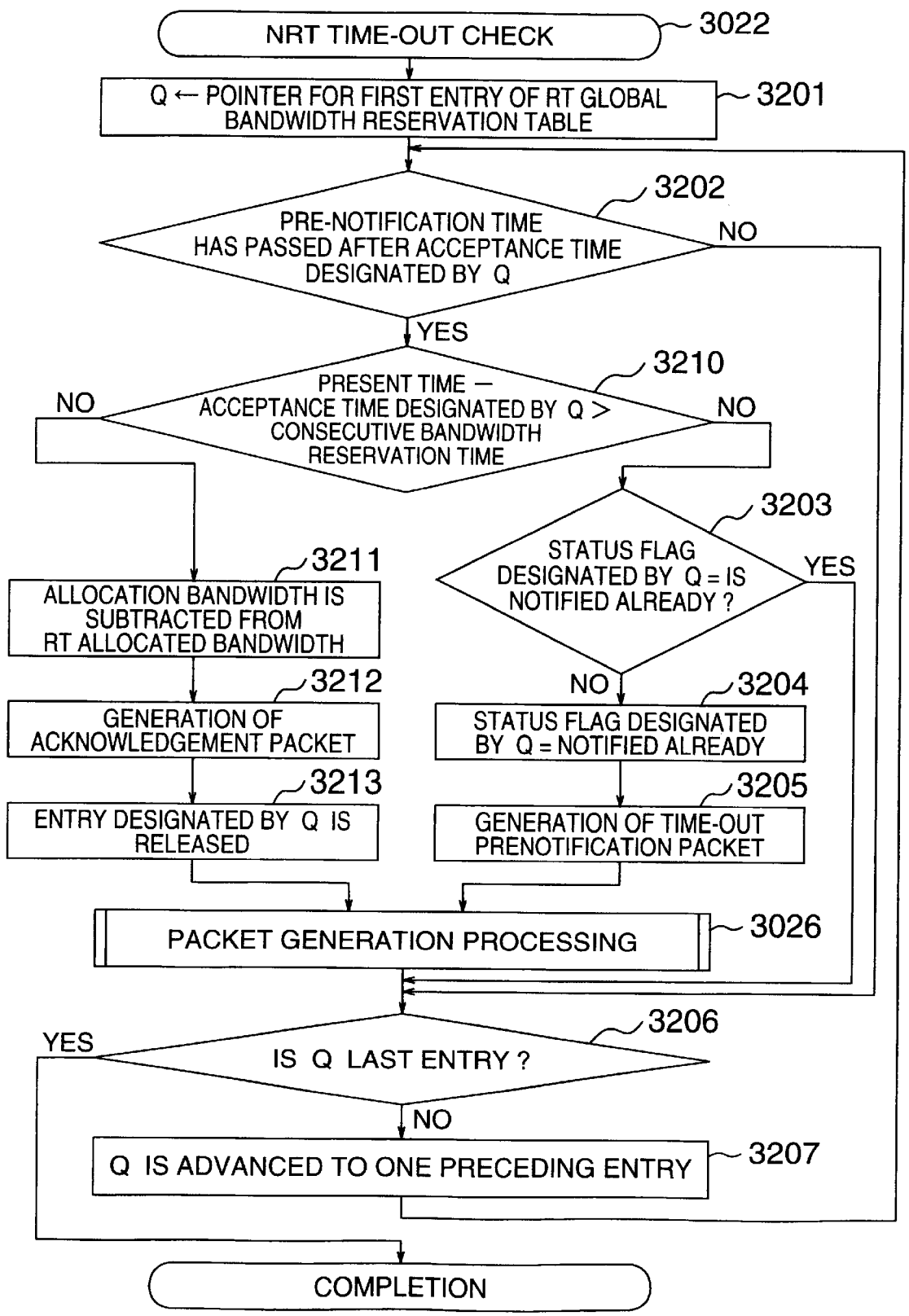
FIG. 32 is a flowchart of an RT time-out check in the embodiment 2.

FIG. 32 shows a processing flow of the RT time-out check 3022. At the step 3201, the processor sets the pointer for the first entry 2521 of the RT global bandwidth reservation table 2472 to the local variable Q representing the pointer to the entries of the RT global bandwidth reservation table 2472. At the step 3202, it is checked whether or not the pre-notification time, which is set by the server by adding a slight time to the consecutive bandwidth reservation time (FIG. 19), such as 10 seconds, has passed after the acceptance time held in the field 2613 designated by the local variable Q and when it does, the flow proceeds to the step 3210 and when it does not, the flow proceeds to the step 3206. The time field 2613 has a time inputted at step 3317 or 3327 (FIG. 33), or step 3513 or 3523 (FIG. 35). At the step 3210, whether or not the difference of the value of the acceptance time field 2613 designated by the local variable Q from the present time exceeds the maximum allowable consecutive bandwidth reservation time, which is set by the server by adding a slight time to the pre-notification time, such as 12 seconds, is checked, and when it does, the flow proceeds to the step 3211 and when it does not, the flow proceeds to the step 3203. At the step 3211, the value obtained by subtracting the allocation bandwidth 2616 designated by the local variable Q from the RT allocated bandwidth 2461 is set to the RT allocated bandwidth 2461.

At the step 3212, the processor secures the input/output buffer 312 for the acknowledgement packet 3801 and sets the broadcast address to the destination address field 3811 of the acknowledgement packet 3801 so secured, the address of its own node to the source address field 3812, the value representing the acknowledgement packet to the type field 3813, the value representing the bandwidth release acknowledgement to the command field 3821, the value of the stream ID field 2611 designated by the local variable Q to the stream ID field 3822, the value of the allocation bandwidth field 2616 designated by the local variable Q to the bandwidth field 3823, the value of the requester address field 2612 designated by the local variable Q to the requester address field 3824 and 0 to the request ID field 3825. Then, the entry designated by the local variable Q is released at the step 3213. At the step 3203, whether or not the value of the status flag 2614 designated by the local variable Q coincides with the value that has been notified, and when it does, the flow proceeds to the step 3206 and when it does not, the flow proceeds to the step 3204. At this step 3204, the value representing completion of the notification is set to the status flag 2614 designated by the local variable Q.

At the step 3205, the processor secures the input/output buffer 312 for the acknowledgement packet 3801, and sets the value of the requester address field 2612 designated by the local variable Q to the destination address field 3811 of the acknowledgement packet 3801 so secured and to the requester address field 384, the address of its own node to the source address field 3812, the value representing the acknowledgement packet to the type field 3183, the value representing the time-out pre-notification to the command field 3821, the value of the stream ID field 2611 designated by the local variable Q to the bandwidth field 3823 and 0 to the request ID field 3825. At the step 3026, a series of processings for generating the packet shown in FIG. 36 are executed. At the step 3206, whether or not the entry designated by the local variable Q is the last entry is checked, and when it does, a series of processings are completed and when it is not, the flow proceeds to the step 3207. At this step 3207, the local variable Q is set to the pointer for the next entry and the flow proceeds to the step 3202.

FIG. 33 shows a processing flow of the bandwidth reservation processing 3023. At the step 3301, whether or not the value of the bandwidth field 3723 of the request packet 3701 is 0 is checked, and when it is 0, the flow proceeds to the step 3311 and when it is not, the flow proceeds to the step 3321. At the step 3311, the pointer for the entry in which the value of the request ID field 3725 of the request packet 3701 coincides with the value of the request ID field 2515 of the NRT global bandwidth reservation table 2471 is set to the local variable P representing the pointer to the entries of this table 2471. Whether or not the entry in which the value of the request ID field 3725 of the request packet 3701 coincides with the value of the request ID field 2515 of the NRT global bandwidth reservation table 2471 exists is checked at the step 3311, and when it does, the flow proceeds to the step 3318 and when it does not, the flow proceeds to the step 3314 from the step 3312. At the step 1314, the pointer for the empty entry of the NRT global bandwidth reservation table 2471 is set to the local variable P. At the step 3315, the value as the sum of 1 and the NRT bandwidth request node number 2462 is set to the NRT bandwidth request number 2462. At the step 3316, the processor sets the value of the requester address field 3324 of the request packet 3701 to the requester address field 2512 designated by the local variable P and the value of the request ID field 3725 of the request packet 3701 is set to the request ID field 2515 designated by the local variable P. At the step 3317, a primary value is set to the stream ID field 2511 designated by the local variable P, the present time is set to the acceptance time field 2513 designated by the local variable P, and 0 is set to the status flag 2514 designated by the local variable P.

At the step 3318, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth reservation acknowledgement to the command field 3821, the value of the stream ID field 2511 designated by the local variable P to the stream ID field 3822, 0 to the bandwidth field 3823, the value of the requester address field 2512 designated by the local variable P to the requester address field 3824 and the value of the request ID field 2515 designated by the local variable P to the request ID field 3825. Thereafter, the processor completes a series of processings.

At the step 3321, the pointer for the entry in which the value of the request ID field 3725 of the request packet 3701 coincides with the value of the request ID field 2615 of the RT global bandwidth reservation table 2472 is set to the local variable P representing the pointer for the entries of the RT global bandwidth reservation table 2472. Whether or not the entry in which the value of the request ID field 3725 of the request packet 3701 coincides with the value of the request ID field 2615 of the global bandwidth reservation table 2472 exists is checked at the step 3322, and when it does, the flow proceeds to the step 3328 and when it does not, the flow proceeds to the step 3323, from the step 3321. At the step 3323, whether or not the sum of the value of the RT allocated bandwidth 2461, the value of the NRT minimum assurance bandwidth 2453, the value of the bandwidth field 3723 of the request packet 3701 and the value of the bandwidth margin 2452 exceeds the value of the physical bandwidth 2451 is checked, and when it does, the flow proceeds to the step 3331 and when it does not, the flow proceeds to the step 3324.

At the step 3324, the pointer for the empty entry of the RT global bandwidth reservation table 2472 is set to the local variable P. At the step 3325, the sum of the RT allocated bandwidth 2461 and the value of the bandwidth field 3723 of the request packet 3701 is set to the RT allocated bandwidth 2461. At the step 3326, the processor sets the value of the requester address field 3724 of the request packet 3701 to the requester address field 2612 designated by the local variable P, the value of the request ID field 3725 to the request ID field 2615 designated by the local variable P and the value of the bandwidth field 3723 of the request packet 3701 to the allocation bandwidth field 2616 designated by the local variable P. At the step 3327, a primary value is set to the stream ID field 2611 designated by the local variable P, the present time is set to the acceptance time field 2613 designated by the local variable P and 0 is set to the status flag field 2614 designated by the local variable P.

At the step 3328, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth reservation acknowledgement to the command field 3821, the value of the stream ID field 2611 designated by the local variable P to the stream ID field 3822, the value of the bandwidth allocation field 2616 designated by the local variable P to the bandwidth field 3823, the value of the requester address field 2612 designated by the local variable P to the requester address field 3824 and the value of the request ID 2615 designated by the local variable P to the request ID field 3825. Thereafter, the processor completes a series of processings. At the step 3331, the processor secures the input/output buffer 312 for the acknowledge packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the bandwidth reservation acknowledgement to the command field 3821, 0 to the stream ID field 3822, 0 which represents that the RT transfer bandwidth cannot be secured to the bandwidth field 3823 and the value of the request ID field 3725 of the request packet 3701 to the request ID field 3825. Thereafter, the processor completes a series of processings.

FIG. 34 shows a processing flow of the bandwidth release processing 3024. At the step 3401, whether or not the value of the bandwidth field 3723 of the request packet 3701 is 0 is checked, and when it is 0, the flow proceeds to the step 3411 and when it is not, the flow proceeds to the step 3421. At the step 3411, the pointer for the entry in which the value of the stream ID field 3722 of the request packet 3701 coincides with the value of the stream ID field 2511 of the NRT global bandwidth reservation table 2471 is set to the local variable P representing the pointer for the entries of the NRT global bandwidth reservation table 2471. At the step 3411, whether or not the entry in which the value of the stream ID 3722 of the request packet 3701 coincides with the value of the stream ID field 2511 of the NRT global bandwidth reservation table 2471 exists is checked, and when it exists, the flow proceeds to the step 3413 and when it does not, the flow proceeds to the step 3431 from the step 3412. At the step 3413, the balance obtained by subtracting 1 from the NRT bandwidth request node number 2462 is set to the RT bandwidth request node number 2462.

At the step 3414, the processor secures the input/output buffer 312 for the acknowledgement packet 3801 and sets the broadcast address to the destination address field 3811 of the acknowledgement packet 3801 so secured, the address of its own node to the source address field 3812, the value representing the release packet to the type field 3821, the value representing the bandwidth release acknowledgement to the command field 3821, the value of the stream ID field 2511 designated by the local variable P to the stream ID field 3822, 0 to the bandwidth field 3823, the value of the requester address field 2512 designated by the local variable P to the requester address field 3824 and the value of the request ID field 3725 of the request packet 3701 to the request ID field 3825. At the step 3415, the processor releases the entry designated by the local variable P and completes a series of processings.

At the step 3421, the pointer for the entry in which the value of the stream ID field 3722 of the request packet 3701 coincides with the value of the stream ID field 2611 of the RT global bandwidth reservation table 2472 is set to the local variable P representing the pointer for the entries of the RT global bandwidth reservation table 2472. Whether or not the entry in which the value of the stream ID field 3722 of the request packet 3701 coincides with the value of the stream ID field 2611 of the RT global bandwidth reservation table 2427 exists is checked at the step 3421, and when it does, the flow proceeds to the step 3423 and when it does not, the flow proceeds to the step 3423 and when it does not, the flow proceeds to the step 3431, from the step 3422. At the step 3423, the value obtained by subtracting the value of the allocation bandwidth field 2616 designated by the local variable P from the RT allocated bandwidth 2461 is set to the RT allocated bandwidth 2461.

At the step 3424, the processor secures the input/output buffer 312 for the acknowledgement packet 3801, and sets the broadcast address to the destination address field 3811 of the acknowledgement packet 3801 so secured, the address of its own node to the destination address field 3812, the value representing the acknowledgement packet to the type field 3813, the value representing the bandwidth release acknowledgement to the command field 3821, the value of the stream ID field 2611 designated by the local variable P to the stream ID field 3822, 0 to the bandwidth field 3823, the value of the requester address field 2612 designated by the local variable P to the requester address field 3824 and the value of the request ID field 3725 of the request packet 3701 to the request ID field 3825. At the step 3425, the entry designated by the local variable P is released and a series of processings are completed.

At the step 3431, the processor secures the input/output buffer 312 for the acknowledgement packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the bandwidth release acknowledgement to the command field 3821, 0 to the stream ID 3822, 0 to the bandwidth field 3823 and the value of the request ID field 3725 of the request packet 3701 to the request ID field 3825, and a series of processings are completed.

FIG. 35 shows a processing flow of the consecutive bandwidth reservation processing 3025. At the step 3501, whether or not the value of the bandwidth field 3723 of the request packet 3701 is 0 is checked, and when it is 0, the flow proceeds to the step 3511 and when it is not, the flow proceeds to the step 3521. At the step 3511, the pointer for the entry in which the value of the stream ID field 3722 of the request packet 3701 coincides with the value of the stream ID field 2511 of the NRT global bandwidth reservation table 2471 is set to the local variable P representing the pointer for the entries of the NRT global bandwidth reservation table 2471. At the step 3511, whether or not the entry in which the value of the stream ID field 3722 of the request packet 3701 coincides with the value of the stream ID 2511 of the NRT global bandwidth reservation table 2471 exists is checked, and when it does, the flow proceeds to the step 3513 and when it does not, the flow proceeds to the step 3531, from the step 3512. At the step 3513, the present time is set to the acceptance time field 2513 designated by the local variable P. At the step 3514, 0 is set to the status flag field 2514 designated by the local variable P.

At the step 3515, the processor secures the input/output buffer 312 for the acknowledge packet 3801, and sets the value of the requester address field 2512 designated by the local variable P to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, the value of the stream ID field 2511 designated by the local variable P to the stream ID field 3822 and the value of the request ID field 3725 of the request packet 3701 to the request ID field 3825. Thereafter, the processor completes a series of processings.

At the step 3521, the pointer for the entry in which the value of the stream ID field 3722 of the request packet 3701 coincides with the value of the stream ID field 2611 of the RT global bandwidth reservation table 2472 is set to the local variable P representing the pointer to the entries of the RT global bandwidth reservation table 2472. Next, whether or not the entry in which the value of the stream ID field 3722 of the request packet 3701 coincides with the value of the stream ID field 2611 of the RT global bandwidth reservation table 2472 exists is checked at the step 3521, and when it does, the flow proceeds to the step 3523 and when it does not, the flow proceeds to the step 3531, from the step 3521. At the step 3523, the present time is set to the acceptance time field 2613 designated by the local variable P and at the step 3524, 0 is set to the status flag field 2614 designated by the local variable P.

At the step 3525, the processor secures the input/output buffer 312 for the acknowledgement packet 3801, and sets the value of the requester address field 2612 designated by the local variable P to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, the value of the stream ID field 2611 designated by the local variable P to the stream ID field 3822, the value of the allocation bandwidth field 2616 designated by the local variable P to the bandwidth field 3823 and the value of the request ID field 3725 of the request packet 3701 to the request ID field 3825. Thereafter, the processor completes a series of processings.

At the step 3531, the processor secures the input/output buffer 312 for the acknowledgement packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, 0 to the stream ID field 3822, 0 to the bandwidth field 3823 and the value of the request ID field 3725 of the request packet 3701 to the request ID field 3825. Thereafter, the processor completes a series of processings.

FIG. 36 shows a processing flow of the packet generation processing 3026. At the step 3601, whether or not the destination address field 3811 of the acknowledgement packet 3801 coincides with the address of its own node is checked, and when it does, the flow proceeds to the step 3604 and when it does not, the flow proceeds to the step 3611. At the step 3604, the acknowledgement packet 3801 is handed over to the local bandwidth reservation management module 1007, this module 1007 is activated and a series of processings are completed. At the step 3611, whether or not the destination address field 3811 of the acknowledgement packet 3801 coincides with the broadcast address is checked, and when it does, the flow proceeds to the step 3612 and when it does not, the flow proceeds to the step 3602.

At the step 3612, the processor secures the input/output buffer 312 for duplication 3801 of the acknowledgement packet and sets the value of the acknowledgement packet 3801 to each of the fields 3811 to 3813 and 3821 to 3826 of the duplication 3801 of the acknowledgement packet so secured. At the step 3613, the duplication 3801 of the acknowledgement packet secured at the step 3612 is handed over to the local bandwidth reservation management module 1007, this module 1007 is actuated and the flow proceeds to the step 3602. At this step 3602, the processor secures the transfer request command 402 for the traffic control command requesting the transfer of the acknowledgement packet 3801 and sets the address of the acknowledgement packet 3801 to the pointer field 412 for the buffer of the transfer request command 402 so secured and the data length of the acknowledgement packet 3801 to the transfer data length field 413. At the step 3603, the transfer request command 402 secured at the step 3602 is connected to the traffic control command queue 1008 and series of processings are completed.

The user process allocates the designated bandwidth to the stream by utilizing the interface provided by the bandwidth reservation module 1005 and transfers the data by utilizing the interface provided by the RT transfer request module 1002 to thereby utilize the real-time communication. After completing the utilization of the real-time communication, the user process releases the bandwidth from the stream by utilizing the interface provided by the bandwidth release module 1006. Further, the user process transfers the data by utilizing the interface provided by the NRT transfer request module 1001 and utilizes the existing communication which does not require the bandwidth allocation.

A bridge system of existing networks and the network according to the present invention can be easily embodied by utilizing a computer having both of the Ethernet input/output controller that utilizes the existing communication method and the Ethernet input/output controller that utilizes the communication method according to the present invention.

In the LAN that has gained a wide application, the present invention can provide the real-time communication assuring the bandwidth for the Ethernet that has become wide spread, without changing the existing hardwares. Further, the present invention can accomplish the real-time communication through the internet by disposing a bridge system having the real-time feature between the networks assuring the bandwidth by hardwares such as an ATM (Automatic Teller Machine) and the LAN to which the present invention is applied.

What is claimed is:

1. A method of managing data transfer comprising the steps of:
   storing a data length (M) in byte units of a plurality of transfer packets capable of being transferred within a predetermined transfer cycle;
   storing said predetermined transfer cycle (t):
      accumulating said transfer packets to be transferred through a stream line within said predetermined transfer cycle; and
      limiting a quantity of said transfer packets to be transferred to a value not greater than said data length (m) by referring to said predetermined transfer cycle.

2. A method of managing data transfer according to claim 1, further comprises the step of:
   limiting the quantity of said packets to be transferred within said predetermined transfer cycle to a value not greater than a difference obtained by subtracting a predetermined data length margin from said data length (m).

3. A method of-managing data transfer according to claim 2, further comprises the step of:

setting the data length (m) of a plurality of said packets capable of being transferred to a value obtained by multiplying first a bandwidth per unit time, which can be transferred in a LAN, by said predetermined transfer cycle, and then subtracting a data length margin from a product so obtained and dividing a balance by the number of nodes connected to said LAN.

4. A method of managing data communication comprising the steps of:

storing a plurality of transfer data of the data length (M) in byte units that can be transferred within a predetermined transfer cycle;

storing said predetermined transfer cycle (t);

accumulating a quantity of data to be transferred through a communication stream within said predetermined transfer cycle; and limiting a quantity of said data to be transferred to said data length (m).

5. A method of managing data communication according to claim 4, further comprising the step of:

limiting the quantity of said data to be transferred within said predetermined transfer cycle to a value not greater than the balance obtained by subtracting a predetermined data length margin from said data length (m).

6. A method of managing data communication according to claim 4, further comprising the steps of:

setting time under a maximum data blank state, which is input by a client and is handled as time used consecutively, as time interval in which transfer of a series of data is to be completed;

setting an allowable time determined to be a considerably greater time by a server based on said consecutive use time; and detecting whether the data received exceeds said consecutive use time.

7. A method of managing data communication according to claim 6, further comprising the step of:

subtracting a data transfer bandwidth from said data length (m) to cope with a request requesting use of said data transfer bandwidth from one of a plurality of clients connected to said communication stream.

8. A method of managing data communication according to claim 4, further comprising the steps of:

checking whether or not to release said data transfer bandwidth when non-reception of data is detected during said consecutive use time; and adding said data transfer bandwidth to said data length when said data transfer bandwidth is released.

9. A method of managing data communication according to claim 4, further comprising the steps of:

accumulating allocated bandwidths when the bandwidths of said communication stream are allocated so as to cope with a request requesting use of the bandwidths of said data communication bandwidths so as to transmit a series of data from a plurality of clients connected to said communication stream;

checking whether or not to release allocated data communication bandwidths when non-reception of data is detected during a predetermined consecutive use time of a series of data transfer; and subtracting a series of said data communication bandwidths from said accumulated bandwidths when said data communication bandwidths are released.

10. A node connected to a network comprising:

a storage for storing a data length (M) in byte units of a plurality of transfer packets capable of being transferred within a predetermined transfer cycle;

a storage for storing a predetermined transfer cycle (t);

an accumulator for accumulating the quantity of said packets to be transferred to a communication stream within said predetermined transmission time interval; and a controller for limiting the quantity of said packets to be transmitted to a value smaller than said data length (m).

11. A node according to claim 10, wherein said controller limits the quantity of said packets to be transmitted within said predetermined transfer cycle to a value smaller than a balance obtained by subtracting a predetermined data length margin from said data length (m).

12. A node according to claim 10, wherein said data length (m) in byte units of a plurality of packets that can be transmitted is set to a quotient obtained by multiplying a bandwidth per unit time capable of being transmitted in a LAN by said predetermined, subtracting said data length (m) from a product and dividing a balance by the number of said nodes connected to said LAN.

13. A method of managing data transfer in a processor connected to a network, comprising the steps of:

(a) taking a transfer request command out of a transfer request queue having a plurality of transfer request commands;

(b) adding a quantity of transfer data for said transfer request command taken out to a local variable;

(c) storing said transfer request command in a transfer command queue if said local value is equal to or less than a predetermined maximum limit; and (d) transferring said transfer request command from said transfer command queue if said local value is more than said predetermined maximum limit, wherein said steps (a) to (d) are repeated at a predetermined transfer cycle.

* * * * *